United States Patent [19]

Hoff et al.

[11] 4,233,182
[45] Nov. 11, 1980

[54] HIGH ACTIVITY CATALYST FOR THE POLYMERIZATION OF ALPHA-OLEFINS

[75] Inventors: Glen R. Hoff, Naperville, Ill.; Peter Fotis, Highland, Ind.

[73] Assignee: Standard Oil Company (Indiana), Chicago, Ill.

[21] Appl. No.: 973,108

[22] Filed: Dec. 26, 1978

[51] Int. Cl.³ .................. C08F 4/62; C08F 4/64; C08F 4/68; C08F 4/02

[52] U.S. Cl. .................... 252/429 C; 252/429 B; 252/431 P; 526/124; 526/121; 526/115; 526/116; 526/114; 526/159; 526/169

[58] Field of Search ............. 252/429 B, 429 C, 431 P

[56] References Cited

U.S. PATENT DOCUMENTS

| | | | |
|---|---|---|---|
| 3,113,115 | 12/1963 | Ziegler et al. | 252/429 A |
| 3,214,417 | 10/1965 | Bloyaert et al. | 252/429 B X |
| 3,546,133 | 12/1970 | Ziegler et al. | 252/429 A |
| 3,624,059 | 11/1971 | Bloyaert et al. | 252/429 C X |
| 3,669,945 | 6/1972 | Nakaguchi et al. | 252/429 B X |
| 3,718,636 | 2/1973 | Stevens et al. | 252/429 C X |
| 3,770,839 | 11/1973 | Matsushima | 252/431 P X |
| 3,840,470 | 10/1974 | Ligorati et al. | 252/429 C |
| 3,901,825 | 8/1975 | Meyer et al. | 252/431 P |
| 3,901,863 | 8/1975 | Berger et al. | 252/429 C X |
| 3,907,849 | 9/1975 | Meyer | 252/431 P X |
| 3,910,976 | 10/1975 | Fein | 252/431 P X |
| 3,969,272 | 7/1976 | Meyer | 252/431 P |
| 4,008,359 | 2/1977 | Meyer et al. | 526/129 |
| 4,041,226 | 8/1977 | Meyer | 252/431 P X |
| 4,109,071 | 8/1978 | Berger et al. | 252/429 C X |
| 4,130,503 | 12/1978 | Fodor | 252/429 B |
| 4,130,699 | 12/1978 | Hoff et al. | 252/429 B X |

FOREIGN PATENT DOCUMENTS 1309987 3/1973 United Kingdom.
1502567 3/1978 United Kingdom.

*Primary Examiner*—Patrick Garvin
*Attorney, Agent, or Firm*—Stephen L. Hensley; William T. McClain; William H. Magidson

[57] ABSTRACT

High activity alpha-olefin polymerization catalysts comprising an organometallic promoter and a component prepared from at least one compound of a Group IVB, VB, or VIB metal, at least one support material which is a divalent metal salt of a phosphorus acid ester having at least one phosphorous acid ester group bonded to metal through oxygen or sulfur, and at least one alkylaluminum halide.

45 Claims, No Drawings

HIGH ACTIVITY CATALYST FOR THE POLYMERIZATION OF ALPHA-OLEFINS

BACKGROUND OF THE INVENTION

This invention relates to the polymerization of alpha-olefins, and more particularly, to highly active alpha-olefin polymerization catalysts comprising an organometallic promoter and a hydrocarbon insoluble component prepared from at least one compound of a metal of Groups IVB, VB, or VIB of the Periodic Table, at least one support material which is a divalent metal salt of an organic ester of a phosphorus acid, and at least one alkylaluminum halide. The Periodic Table referred to herein is that appearing in *Handbook of Chemistry and Physics*, 50th ed., Chemical Rubber Co. (1969).

In the polymerization of alpha-olefins, both process efficiency and product characteristics can vary substantially depending on the choice of polymerization catalyst. For example, from the standpoint of process efficiency it is desirable to employ highly active catalysts which allow for preparation of polyalpha-olefins in sufficiently high yields, relative to the amount of catalyst employed, that separation of catalyst residues from the polymeric product is unnecessary. From the standpoint of product characteristics, it is desirable to be able to produce a wide range of product grades using a single catalyst, and to this end, the catalyst to be employed should exhibit a relatively high sensitivity to agents, such as hydrogen, typically employed during polymerization to control polymer molecular weights. Further, the catalyst to be employed should be capable of producing polyalpha-olefins having molecular weight distributions sufficient to ensure ease of processing.

In an attempt to provide catalysts having one or more of the above properties, the prior art has proposed a variety of catalysts generally comprising an organometallic promoter and a supported transition metal-containing component. Prior art that may be considered relevant to the present invention includes the following patents. U.S. Pat. No. 3,901,863, to Berger et al., discloses highly active alpha-olefin polymerization catalysts comprising an organometallic promoter and a supported component prepared by reacting a compound of a Group IVB, VB, or VIB metal with a support material which is a compound of a Group IA, IIA, IIB, IIIA, IVA, VIIB, or VIII metal having at least one sequence of metal-oxygen-organic radical bonds per metal atom, and then reacting the resulting product with an alkylaluminum halide. The support material also may include other radicals, including $(PO_4)_{\frac{1}{3}}$, attached to the metal through oxygen. Additionally, the organic radicals attached to the metal through oxygen may contain "hetero atoms such as O, N, P . . . in their chain." However, there is no suggestion to employ phosphorus acid ester salts as a support material. Similar proposals are found in U.S. Pat. No. 3,718,636, to Stevens et al., and British Pat. No. 1,309,987, to Solvay, both of which disclose alpha-olefin polymerization catalysts comprising an organometallic promoter and a component prepared by treatment of a support material which is a compound of a divalent metal such as calcium, zinc, manganese, cobalt, nickel, or magnesium, with an organometallic compound and reaction of the resulting product with a halide or oxohalide of a Group IVB, VB, or VIB metal. It is disclosed that suitable support materials include "salts of inorganic oxyacids, for example, sulfates, nitrates, phosphates, carbonates and silicates." A related proposal is found in U.S. Pat. No. 3,214,417, to Bloyaert et al., which discloses alpha-olefin polymerization catalysts comprising an organometallic promoter and a component prepared from a support material which is an inorganic phosphate salt, and a halide, alkoxide, or alkoxyhalide of a Group IVB, VB, or VIB metal. Hydrated metal orthophosphates and hydrated and anhydrous hydroxyphosphates are specifically disclosed as useful support materials. Stevens et al., Solvay, and Bloyaert et al. fail to suggest the use of phosphorus acid ester salts as support materials.

Although certain of the above-described catalysts exhibit one or more desirable properties, the majority fail to exhibit a suitable balance of high activity, sensitivity to molecular weight control agents, and capability to produce polyalpha-olefins having suitable molecular weight distributions. Accordingly, there is a need for an improved alpha-olefin polymerization catalyst having a suitable balance of properties. It is an object of this invention to provide an improved alpha-olefin polymerization catalyst and a method for the preparation thereof. A further object of the invention is to provide alpha-olefin polymerization catalysts having sufficiently high activities to eliminate the need for separation of catalyst residues from polymeric products, sufficiently high sensitivity to molecular weight control agents as to allow for the preparation of a wide range of product grades using a single catalyst, and the ability to produce polyalpha-olefins which are easily processed. A further object of the invention is to provide for the polymerization of alpha-olefins in the presence of such catalysts. Other objects of the invention will be apparent to persons of skill in the art from the following description and the appended claims.

We have found that the objects of this invention can be achieved through the use of divalent metal salts of phosphorus acid esters having at least one phosphorus acid ester group bonded to metal through oxygen or sulfur as support materials in the preparation of supported, transition metal-containing catalyst components. The invented supported catalyst components, when combined with an organometallic promoter and employed in the polymerization of alpha-olefins, exhibit a relatively high sensitivity to molecular weight control agents and are capable of producing polyalpha-olefins having molecular weight distributions sufficient to ensure ease of processing, and as such, are useful in the preparation of commercially useful polymeric products. Moreover, the catalysts exhibit extremely high activities, and accordingly, such commercially useful products can be produced without the need for separation of catalyst residues. Additionally, polymers produced in the presence of the invented catalysts contain advantageously low levels of fine particles such that handling and processing of the polymers is facilitated. Moreover, the invented catalysts offer advantages in terms of compatability with polymerization systems wherein temporarily and reversibly deactivated catalyst components are added to a polymerization zone in a flush stream containing polymerizable alpha-olefin or otherwise contact polymerizable monomer prior to entry into the polymerization zone because the components can be temporarily and reversibly deactivated by contact with conventional deactivation agents prior to entry into the polymerization zone and then activated with an organometallic promoter within the polymerization zone.

As noted above, a variety of alpha-olefin polymerization catalysts containing supported components prepared from compounds of the Group IVB, VB, or VIB metals and support materials which are compounds of divalent metals have been reported and it is generally known that catalyst performance can vary substantially depending on the choice of support material. However, the highly desirable performance of the inverted catalysts could not have been predicted from that of known catalysts. Thus, as illustrated in the examples appearing hereinafter, the use of divalent metal salts of organic esters of phosphorus acids as support materials leads to catalysts of unexpectedly high activities as compared with the activities of known catalysts containing supported components prepared from divalent metal salts of inorganic phosphates. The invented catalysts also allow for significantly greater control of polymer molecular weights than do such prior art catalysts. It also is surprising that phosphorus acid ester salts of not only magnesium, but also other divalent metals such as manganese and iron can be employed according to this invention to obtain highly desirable results. While the prior art has disclosed the use of salts of a wide variety of metals as support materials, persons of skill in the art are well aware that the use of salts of metals other than magnesium typically leads to catalysts of little practical value.

Divalent metal salts of organic esters of phosphorus acids have been disclosed as being useful in the preparation of unsupported, vanadium and chromium organophosphates useful as alpha-olefin polymerization catalyst components, and such prior art may be of interest to the present invention. For example, U.S. Pat. No. 3,910,976, to Fein, discloses hydrocarbon soluble halo or pseudo-halo derivatives of vanadium organophosphates which are prepared by reaction, in aqueous solution, of divalent metal salts of halogen containing phosphorus acid esters, including salts of beryllium, magnesium, calcium, zinc, strontium, cadmium, and barium, with tetravalent vanadyl salts such as the sulfate, halides, oxalate, or acetate. The disclosed compositions are combined with an organoaluminum halide and employed in the polymerization of alpha-olefins, and particularly in the preparation of EP and EPDM rubbers. U.S. Pat. No. 3,669,945 to Nakaguchi et al., also discloses compositions useful as alpha-olefin polymerization catalyst components and prepared by reacting, either neat or in the presence of water and/or alcohol, a vanadium compound, such as an oxide, halide, oxohalide, sulfate, oxosulfate, or a salt or ester of vanadic acid, with a phosphoric acid or a salt thereof or an ester thereof with an alcohol, and treating the resulting product with an alcohol. It also is disclosed that the resulting catalyst component may be deposited on a carrier material such as a metal oxide.

Catalyst components similar to those described above but containing chromium instead of vanadium are disclosed in U.S. Pat. Nos. 3,901,825 and 4,008,359, both to Meyer et al., and U.S. Pat. Nos. 3,969,272, and 4,041,226, both to Meyer. These catalyst components are hydrocarbon soluble chromium tris-diorgano orthophosphates and are prepared by reacting, typically in the presence of water, metal salts of organic esters of phosphorus acid, including salts of divalent magnesium, with trivalent chromium compounds. The use of silica, talc, and other non-reinforcing powdered fillers as carriers for such catalyst components also is disclosed.

Although the above-described patents may be of interest to the present invention in disclosing the use of divalent metal salts of organic esters of phosphorus acids in the preparation of alpha-olefin polymerization catalyst components, the invented catalyst components are clearly distinguishable. In contrast to the disclosed, unsupported, vanadium and chromium organophosphates, which may be prepared by reaction of vanadium or chromium compounds with divalent metal salts of organic esters of phosphorus acids such that metathesis of the metals takes place, the invented catalyst components are supported, hydrocarbon insoluble materials prepared by bonding compounds of the Group IVB, VB, or VIB metals to divalent metal salts of organic esters of phosphorus acids. Moreover, the catalyst components of the aforesaid patents typically are prepared in the presence of water. In contrast, water acts as a poison to the invented catalyst components and is excluded during preparation. Further, the catalysts of such patents exhibit low activities as compared to the invented catalysts.

DESCRIPTION OF THE INVENTION

Briefly, the catalysts of this invention comprise (A) an organometallic promoter; and (B) a solid, hydrocarbon insoluble reaction product of components comprising at least one compound of a metal of Groups IVB, VB, or VIB or the Periodic Table, at least one divalent metal salt of a phosphorus acid ester having at least one phosphorus acid ester group bonded to metal through oxygen or sulfur, and at least one alkylaluminum halide.

Compounds of the Group IVB, VB, and VIB metals which are useful in preparation of the solid, hydrocarbon insoluble, supported components of this invention include metal halides, oxohalides, and alkoxides, oxoalkoxides, alkoxyhalides, and oxoalkoxyhalides containing 1 to about 20 carbon atoms per alkoxy radical such as methoxy, butoxy, octoxy, decoxy, tetradecoxy, and eicosoxy. Mixtures of compounds of the same or different metals also can be employed. Useful metals include tetravalent titanium, tetravalent zirconium, trivalent vanadium, tetravalent vanadium, and pentavalent vanadium.

Preferably, the Group IVB, VB, or VIB metal component employed according to the invention comprises at least one titanium(IV) chloride, bromide, alkoxide, alkoxychloride, or alkoxybromide wherein each alkoxy radical contains from 1 to about 10 carbon atoms; at least one zirconium(IV) chloride, bromide, alkoxide, alkoxychloride, or alkoxybromide wherein each alkoxy radical contains from 1 to about 10 carbon atoms; at least one vanadium(III) or (IV) chloride, bromide, alkoxide, alkoxychloride or alkoxybromide wherein each alkoxy radical contains from 1 to about 10 carbon atoms; at least one vanadium(IV) or (V) oxochloride, oxobromide, oxoalkoxide, oxoalkoxychloride, or oxoalkoxybromide wherein each alkoxy radical contains 1 to about 10 carbon atoms; or a mixture thereof.

Specific examples of Group IVB, VB, and VIB metal compounds include $TiCl_4$, $TiBr_4$, $Ti(OCH_3)Br_3$, $Ti(OC_4H_9)Cl_3$, $Ti(OC_6H_{13})Cl_3$, $Ti(OC_{10}H_{21})Cl_3$, $Ti(OCH_3)_2Cl_2$, $Ti(OC_4H_9)_2Cl_2$, $Ti(OC_6H_{13})_2Cl_2$, $Ti(OC_{10}H_{21})_2Br_2$, $Ti(OCH_3)_3Br$, $Ti(OC_4H_9)_3Cl$, $Ti(OC_6H_{13})_3Cl$, $Ti(OC_{10}H_{21})_3Cl$, $Ti(OCH_3)_4$, $Ti(OC_4H_9)_4$, $Ti(OC_6H_{13})_4$, $Ti(OC_{10}H_{21})_4$, $ZrCl_4$, $ZrBr_4$, $Zr(OCH_3)Cl_3$, $Zr(OC_4H_9)Cl_3$, $Zr(OC_6H_{13})Br_3$, $Zr(OC_{10}H_{21})Cl_3$, $Zr(OCH_3)_2Br_2$, $Zr(OC_4H_9)_2Cl_2$, $Zr(OC_6H_{13})_2Cl_2$, $Zr(OC_{10}H_{21})_2Cl_2$, $Zr(OCH_3)_3Cl$, Zr(OC₄H₉)₃Cl, Zr(OC₆H₁₃)₃Cl, Zr(OC₁₀H₂₁)₃Br, Zr(OCH₃)₄, Zr(OC₄H₉)₄, Zr(OC₆H₁₃)₄, Zr(OC₁₀H₂₁)₄, VCl₃, VBr₃, V(OCH₃)Cl₂, V(OC₄H₉)Cl₂, V(OC₆H₁₃)Cl₂, V(OC₁₀H₂₁)Br₂, V(OCH₃)₂Br, V(OC₄H₉)₂Cl, V(OC₆H₁₃)₂Cl, V(OC₁₀H₂₁)₂Cl, V(OCH₃)₃, V(OC₄H₉)₃, V(OC₆H₁₃)₃, V(OC₁₀H₂₁)₃, VCl₄, VBr₄, V(OCH₃)Cl₃, V(OC₄H₉)Cl₃, V(OC₆H₁₃)Cl₃, V(OC₁₀H₂₁)Cl₃, V(OCH₃)₂Br₂, V(OC₄H₉)₂Cl₂, V(OC₆H₁₃)₂Br₂, V(OC₁₀H₂₁)₂Cl₂, V(OCH₃)₃Br, V(OC₄H₉)₃Cl, V(OC₆H₁₃)₃Cl, V(OC₁₀H₂₁)₃Br, V(OCH₃)₄, V(OC₄H₉)₄, V(OC₆H₁₃)₄, V(OC₁₀H₂₁)₄, VOCl₂, VOBr₂, VO(OCH₃)Cl, VO(OC₄H₉)Br, VO(OC₆H₁₃)Cl, VO(OC₁₀H₂₁)Br, VO(OCH₃)₂, VO(OC₄H₉)₂, VO(OC₆H₁₃)₂, VO(OC₁₀H₂₁)₂, VOCl₃, VOBr₃, VO(OCH₃)Cl₂, VO(OC₄H₉)Cl₂, VO(OC₆H₁₃)Br₂, VO(OC₁₀H₂₁)Cl₂, VO(OCH₃)₂Br, VO(OC₄H₉)₂Cl, VO(OC₆H₁₃)₂Cl, VO(OC₁₀H₂₁)₂Br, VO(OCH₃)₃, VO(OC₄H₉)₃, VO(OC₆H₁₃)₃, and VO(OC₁₀H₂₁)₃. Certain of the alkoxides, alkoxyhalides, oxoalkoxides, and oxoalkoxyhalides are commonly available in the form of complexes with an alcohol. An example is Zr(OC₄H₉)₄·C₄H₉OH. For purposes hereof, the terms alkoxide, alkoxyhalide, oxoalkoxide, and oxoalkoxyhalide and the specific examples set forth above are intended to include such complexes.

From the standpoint of activity, titanium tetrachloride and titanium(IV) alkoxides, and alkoxychlorides having 1 to about 6 carbon atoms per alkoxy radical, and particularly the alkoxides, give best results. Titanium tetrabutoxide is most preferred in this regard. From the standpoint of maximizing polyalpha-olefin molecular weight distributions while ensuring relatively high activities, best results are achieved through the use of mixtures of at least one titanium(IV) chloride, alkoxide, or alkoxychloride of 1 to about 6 carbon atoms per alkoxy radical with at least one zirconium(IV) chloride, alkoxide, or alkoxychloride of 1 to about 6 carbon atoms per alkoxy radical and/or vanadium(III), (IV), or (V) compound selected from the group consisting of the chlorides, oxochlorides, alkoxides, oxoalkoxides, alkoxychlorides, and oxoalkoxychlorides having 1 to about 6 carbon atoms per alkoxy radical. Mixtures of titanium tetraalkoxides and zirconium tetraalkoxides, and particularly the butoxides, wherein the atomic ratio of zirconium to titanium ranges from about 0.1:1 to about 10:1 are most preferred from the standpoint of maximizing molecular weight distributions while maintaining high activities.

Support materials useful in preparation of the solid, hydrocarbon insoluble, supported components of the invented catalysts are divalent metal salts of phosphorus acid esters having at least one phosphorus acid ester group bonded to metal through oxygen or sulfur. Preferably, the second group bonded to metal is the identical phosphorus acid ester group bonded through oxygen or sulfur, however, other groups such as different phosphorus acid ester groups bonded through oxygen or sulfur as well as alkyl, aryl, alkoxy, aryloxy, carboxylate, carbonate, inorganic phosphate, sulfate, halide, hydroxyl, or other suitable groups also can constitute the second group bonded to metal.

For purposes hereof, a phosphorus acid ester group bonded to metal through oxygen or sulfur can be represented by the formula

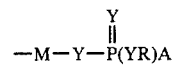

In the formula, M is a divalent Group IIA, IIB, IVa, VIIB, or VIII metal such as beryllium, magnesium, calcium, zinc, cadmium, tin, manganese, iron, or cobalt, with magnesium, manganese, and iron being preferred and magnesium most preferred. Each Y in the formula is independently oxygen or sulfur, with oxygen being preferred. A in the formula is hydrogen, —YH, R, or —YR, and each R is independently an organic radical or a halo- or amino-substituted organic radical, said organic radical being an alkyl radical of 1 to about 12 carbon atoms, such as methyl, ethyl, butyl, octyl, and dodecyl, an aryl radical of 6 to about 10 carbon atoms, such as phenyl and naphthyl, or an alkaryl or aralkyl radical of 7 to about 12 carbon atoms such as tolyl, cresyl, ethylphenyl, butylphenyl, hexylphenyl, phenylethyl, and phenylbutyl. Preferably, R is an alkyl radical of 1 to about 6 carbon atoms.

Examples of the above-described phosphorus acid ester groups bonded through oxygen or sulfur include organophosphite groups such as methyl phosphite and phenyl phosphite; organo thiophosphite groups such as butyl thiophosphite and tolyl thiophosphite; organo thionophosphite groups such as ethyl thionophosphite and cresyl thionophosphite; organo thiothionophosphite groups such as methyl thiothionophosphite and hexyl thiothionophosphite; mono- and diorgano orthophosphate groups such as ethyl orthophosphate, diethyl orthophosphate, butyl orthophosphate, dibutyl orthophosphate, phenyl orthophosphate, and diphenyl orthophosphate; mono- and diorgano mono- and dithiophosphate groups such as methyl thiophosphate, dimethyl thiophosphate, dimethyl dithiophosphate, decyl thiophosphate, didecyl thiophosphate, and didecyl dithiophosphate; mono- and diorgano thionophosphate groups such as octyl thionophosphate, dioctyl thionophosphate, naphthyl thionophosphate, and dinaphthyl thionophosphate; mono- and diorgano mono- and dithiothionophosphate groups such as ethyl thiothionophosphate, diethyl thiothionophosphate, diethyl dithiothionophosphate, dodecyl thiothionophosphate, didodecyl thiothionophosphate, and didodecyl dithiothionophosphate; organo organophosphonate groups such as ethyl ethylphosphonate, 2-chloroethyl 2-chloroethylphosphonate, ethyl butylphosphonate, octyl octylphosphonate, phenyl phenylphosphonate, and phenylethyl ethylphosphonate; organo thioorganophosphonate groups such as methyl thiomethylphosphonate, butyl thiobutylphosphonate, and tolyl thiotolylphosphonate; organo organothionophosphonates such as ethyl methylthionophosphonate, hexyl hexylthionophosphonate, and decyl decylthionophosphonate; and organo thioorganothionophosphonate groups such as ethyl thioethylthionophosphonate, ethyl thiohexylthionophosphonate, and phenyl thiophenylthionophosphonate.

Phosphorus acid ester salts which are preferred for use according to this invention are those of magnesium, manganese(II), and iron(II) wherein both groups bonded to metal are identical phosphorus acid ester groups bonded through oxygen or sulfur. More preferably, phosphorus acid ester salts wherein the organic radicals contain from 1 to about 6 carbon atoms are employed. Due to the toxicity of the thio-, thiono-, and thiothionoesters, the alkyl phosphite, mono- and dialkyl orthophosphate, and alkyl alkylphosphonate salts containing 1 to about 6 carbon atoms per alkyl radical are particularly preferred. Specific examples of such salts include the bis(methyl phosphite), bis(butyl phosphite), bis(ethyl orthophosphate), bis(diethyl orthophosphate), bis(butyl orthophosphate), bis(dibutyl orthophosphate), bis(hexyl orthophosphate), bis(dihexyl orthophosphate), bis(methyl methylphosphonate), bis(ethyl ethylphosphonate), and bis(hexyl hexylphosphonate) salts of magnesium, manganese(II) and iron(II).

Among the above-described phosphorus acid ester salts, the bis(dialkyl orthophosphate) salts of magnesium, manganese(II), and iron(II) having 1 to about 6 carbon atoms per alkyl radical are most preferred. From the standpoint of catalytic activity, the bis(dialkyl orthophosphate) salts of magnesium and manganese(II), and especially the former, give best results. Maximum activity is attained through the use of magnesium bis(diethyl orthophosphate).

The above-described salts of phosphorus acid esters are known compounds and can be prepared according to known methods such as by reacting appropriate metal halides with appropriate phosphorus acid esters of thioesters as reported in Mikulski, C. M., et al., *Chem. Abs.*, vol. 80 p. 518 (1974) and Mikulski, C. M., et al. *Chem. Abs., vol.* 75, pp. 485–6 (1971); and by reacting phosphorous pentoxide, halides of appropriate metals, and hydroxyl group-containing organic compounds as disclosed in U.S. Pat. No. 3,401,184, to Revukas. When such preparative methods are employed, care should be taken to dry the metal halides employed as starting materials, such as by heating or contacting with a chemical drying agent such as thionyl chloride. It also is advisable to carry out the preparation under anhydrous conditions and to substantially remove hydrogen halide and/or organic halide reaction by-products from the products prior to use thereof as support materials according to the present invention to ensure that oxygen, water, and halogen-containing by-products, which can adversely affect the activity of the invented catalysts, are excluded during preparation of catalyst components. Anhydrous conditions can be maintained during preparation of support materials by carrying out the preparation under an atmosphere of an inert gas such as nitrogen or by other suitable means. Reaction by-products are suitably removed by washing with appropriate solvents such as hexane, heptane, octane, nonane, and benzene.

A preferred method for preparing support materials useful according to this invention, and particularly the phosphorus acid ester salts wherein both groups bonded to metal are phosphorus acid ester groups bonded through oxygen or sulfur, is disclosed in our copending patent application, Ser. No. 972,822, filed in the name of Glen R. Hoff and Peter Fotis on the instant filing date. The method according to our copending application comprises reacting at least one metal salt of an organic acid with at least one phosphorus acid ester in amounts such that a phosphorus acid ester salt having at least one phosphorus acid ester group bonded to metal through oxygen or sulfur is produced, and at a temperature such that the metal acid salt and the phosphorus acid ester will react without substantial decomposition of the phosphorus acid ester. Advantageously, the metal acid salts employed as starting materials are easier to dry and maintain in anhydrous condition than the metal halides employed according to the above-described preparations. Further the primary reaction by-products produced according to this method are organic acid esters which are more easily removed than are the halogen-containing by-products produced according to the above-described preparative methods. The method disclosed in our copending application is particularly advantageous in the preparation of phosphorus acid ester salts wherein the organic radicals are alkyl radicals of 1 to about 6 carbon atoms because the metal acid salts and phosphorus acid esters employed as starting materials are such that low boiling organic acid ester by-products are formed. These by-products can be conveniently and substantially removed during the preparation through the use of appropriate temperatures and as a result, support materials of high purity can be prepared at high production rates.

The metal acid salts employed as starting materials according to the method of our copending application are selected on the basis of the phosphorus acid ester salt desired. Suitable metal acid salts include the divalent Group IIA, IIB, IVA, VIIB, and VIII metal salts of aliphatic acids having 2 to about 20 carbon atoms, aromatic acids having 7 to about 12 carbon atoms, and aliphatically-substituted aromatic acids and aryl-substituted aliphatic acids having 8 to about 20 carbon atoms. Salts of monocarboxylic acids are preferred although salts of di-, tri-, and tetracarboxylic acids also are suitable. Specific examples of divalent Group IIA, IIB, IVA, VIIB, and VIII metals include magnesium, calcium, zinc, cadmium, tin, manganese, iron, and cobalt.

Specific examples of the organic acid groups bonded to the aforesaid metals include aliphatic acid groups of 2 to about 20 carbon atoms such as acetate, oxalate, propionate, malonate, acrylate, butyrate, succinate, crotonate, vinylacetate, maleate, hydrosorbate, octoate, suberate, laurate, palmitate, stearate, oleate, linoleate, arachidate, and arachidonate; aromatic acid groups of 7 to about 12 carbon atoms such as benzoate, phthalate, trimellitate, naphthoate, and naphthalate; and aliphatically-substituted aromatic acid groups and aryl-substituted aliphatic acid groups of 8 to about 20 carbon atoms such as toluate, xylilate, ethylbenzoate, diethylbenzoate, butylbenzoate, hexylbenzoate, decylbenzoate, tetradecylbenzoate, phenacetate, phenylbutyrate, phenylvalerate, and phenyllaurate. Certain of the unsaturated acid salts, such as the acrylates and methacrylates, tend to polymerize on heating. To avoid polymerization, it is contemplated to employ a conventional polymerization inhibitor in conjunction with such salts and/or to avoid exposure of the salts to polymerizing temperatures.

Specific examples of useful metal salts include magnesium acetate, magnesium oxalate, magnesium butyrate, magnesium vinylacetate, magnesium octoate, magnesium laurate, magnesium oleate, magnesium benzoate, magnesium trimellitate, magnesium toluate, magnesium hexylbenzoate, magnesium phenacetate, calcium acetate, calcium malonate, calcium stearate, zinc acetate, zinc maleate, zinc stearate, zinc trimellitate, zinc phenacetate, manganous acetate, manganous propionate, manganous octoate, manganous succinate, manganous oleate, manganous benzoate, manganous toluate, manganous phenacetate, ferrous acetate, ferrous maleate, ferrous benzoate, and ferrous phenacetate.

As can be appreciated, the particular metal salt to be employed as a starting material will vary depending upon the desired final product. Mixtures of salts of the same or different metals can be employed if desired. The preparation involves replacement of organic acid groups with phosphorus acid ester groups and formation of organic acid ester by-products which can adversely affect catalytic activity. Accordingly, irrespective of the metal contained in the metal salt, it is preferred to employ materials wherein the organic acid groups bonded to the metal are such as to lead to formation of low boiling organic acid ester by-products to facilitate removal thereof. Preferred metal salts are those wherein the organic acid groups are alkanoic acid groups of 2 to about 6 carbon atoms such as acetate, propionate, butyrate, valerate, and caproate. Most preferably, the metal salts employed as starting materials are metal acetates. Specific examples of useful metal acetates include magnesium acetate, calcium acetate, zinc acetate, manganous acetate and ferrous acetate.

In order to avoid contamination of support materials with water and other catalyst poisons, the above-described metal salts are employed in the anhydrous state and to this end, drying of the salts prior to use is desirable, particularly with respect to salts of the Group IIB and VIIB metals as these are commonly obtained in the hydrated form. Known drying techniques, such as heating or contacting with a chemical drying agent can be employed. When a chemical drying agent is employed it is preferred to use materials, such as carboxylic acid anhydrides, which give by-products which are easily removed from the anhydrous metal salts. Acetic anhydride is particularly useful in this regard.

Phosphorus acid esters useful according to the method of our copending application are compounds of the formula Y=P(YR)$_2$A, wherein each Y is independently oxygen or sulfur; A is hydrogen, —YH, —YR, or R; and each R is independently an organic radical or an amino- or halo-substituted organic radical, such organic radicals being selected from the group consisting of alkyl radicals of 1 to about 12 carbon atoms, aryl radicals of 6 to about 10 carbon atoms, and aralkyl and alkaryl radicals of 7 to about 12 carbon atoms. Such compounds include the diorgano phosphites (O=P(OR)$_2$H); diorgano mono- and dithiophosphites (O=P(OR)(SR)H and O=P(SR)$_2$H); diorgano thionophosphites (S=P(OR)$_2$H); diorgano mono- and dithiothionophosphites (S=P(OR)(SR)H and S=P(SR)$_2$H); diorgano orthophosphates (O=P(OR)$_2$(OH)); diorgano mono-, di- and trithiophosphates (O=P(OR)(SR)(OH), O=P(OR)$_2$(SH), O=P(SR)$_2$(OH), O=P(OR)(SR)(SH), and O=P(SR)$_2$(SH)); diorgano thionophosphates (S=P(OR)$_2$(OH)); diorgano mono-, di- and trithiothionophosphates (S=P(OR)(SR)(OH), S=P(OR)$_2$(SH), S=P(SR)$_2$(OH), S=P(OR)(SR)(SH), and S=P(SR)$_2$SH)); triorgano orthophosphates (O=P(OR)$_3$); triorgano mono-, di-, and trithiophosphates (O=P(OR)$_2$(SR), O=P(OR)(SR)$_2$, and O=P(SR)$_3$); triorgano thionophosphates (S=P(OR)$_3$); triorgano mono-, di-, and trithiothionophosphates (S=P(OR)$_2$(SR), S=P(OR)(SR)$_2$, and S=P(SR)$_3$); diorgano organophosphonates (O=P(OR)$_2$R); diorgano mono- and dithioorganophosphonates (O=P(OR)(SR)R and O=P(SR)$_2$R); diorgano organothionophosphonates (S=P(OR)$_2$R); and diorgano mono- and dithioorganothionophosphonates (S=P(OR)(SR)R and S=P(SR)$_2$R). Mixtures of phosphorus acid esters also can be employed.

Specific examples of diorgano phosphites include dimethyl phosphite, diethyl phosphite, di-2-aminoethyl phosphite, dihexyl phosphite, hexyl decyl phosphite, didecyl phosphite, didodecyl phosphite, diphenyl phosphite, dichlorophenyl phosphite, dinaphthyl phosphite, ethyl phenyl phosphite, ditolyl phosphite, dimethylphenyl phosphite, dihexylphenyl phosphite, and diphenylhexyl phosphite.

Specific examples of diorgano mono- and dithiophosphites include dimethyl thiophosphite and dithiophosphite, diethyl thiophosphite and dithiophosphite, ethyl butyl thiophosphite and dithiophosphite, dihexyl thiophosphite and dithiophosphite, didodecyl thiophosphite and dithiophosphite, diphenyl thiophosphite and dithiophosphite, phenyl hexyl thiophosphite and dithiophosphite, diphenylhexyl thiophosphite and dithiophosphite, and dioctylphenyl thiophosphite and dithiophosphite.

Specific examples of diorgano thionophosphites include dimethyl thionophosphite, diethyl thionophosphite, dioctyl thionophosphite, octyl decyl thionophosphite, didodecyl thionophosphite, ethyl phenyl thionophosphite, diphenyl thionophosphite, ditolyl thionophosphite, and dihexylphenyl thionophosphite.

Specific examples of diorgano mono- and dithiothionophosphites include dimethyl thiothionophosphite and dithiothionophosphite, diethyl thiothionophosphite and dithiothionophosphite, dibutyl thiothionophosphite and dithiothionophosphite, butyl hexyl thiothionophosphite and dithiothionophosphite, diethylhexyl thiothionophosphite and dithiothionophosphite, didecyl thiothionophosphite and dithiothionophosphite, didodecyl thiothionophosphite and dithiothionophosphite, diphenyl thiothionophosphite and dithiothionophosphite, diaminophenyl thiothionophosphite and dithiothionophosphite, ethyl phenyl thiothionophosphite and dithiothionophosphite, diphenylethyl thiothionophosphite and dithiothionophosphite, diphenylhexyl thiothionophosphite and dithiothionophosphite, and dihexylphenyl thiothionophosphite and dithiothionophosphite.

Specific examples of di- and triorgano orthophosphates include di- and trimethyl orthophosphate, di- and triethyl orthophosphate, di- and tributyl orthophosphate, di- and trihexyl orthophosphate, di- and tridecyl orthophosphate, di- and tridodecyl orthophosphate, di- and triphenyl orthophosphate, ethyl phenyl orthophosphate, ethyl diphenyl orthophosphate, di- and trichlorophenyl orthophosphate, di- and triphenylbutyl orthophosphate, di- and trihexylphenyl orthophosphate, di- and triphenylethyl orthophosphate, and di- and triphenylhexyl orthophosphate.

Specific examples of di- and triorgano mono-, di-, and trithiophosphates include O,O-dimethyl thiophosphate (O=P(OCH$_3$)$_2$(SH)), O,S-dimethyl thiophosphate (O=P(OCH$_3$)(SCH$_3$)(OH)), O,S-dimethyl dithiophosphate (O=P(OCH$_3$)(SCH$_3$)(SH)), S,S-dimethyl dithiophosphate (O=P(SCH$_3$)$_2$(OH)), dimethyl trithiophosphate (O=P(SCH$_3$)$_2$(SH)), trimethyl thiophosphate, dithiophosphate, and trithiophosphate O,O-diethyl thiophosphate, O,S-diethyl dithiophosphate, diethyl trithiophosphate, triethyl thiophosphate, dithiophosphate, and trithiophosphate, O-ethyl S-pentyl thiophosphate, O-ethyl S-pentyl dithiophosphate, ethyl pentyl trithiophosphate, O,O-diethyl S-pentyl thiophosphate, O,S-diethyl O-pentyl thiophosphate, O,S-diethyl S-pentyl dithiophosphate, S,S-diethyl O-pentyl dithiophosphate, diethyl pentyl trithiophosphate, O,S-dichloroethylhexyl thiophosphate, S,S-dichloroethylhexyl dithiophosphate, trichloroethylhexyl thiophosphate, dithiophosphate, and trithiophosphate, O,S-didodecyl thiophosphate, O,S-didodecyl dithiophosphate, didodecyl trithiophosphate, tridodecyl thiophosphate, dithiophosphate, and trithiophosphate, O,O-diphenyl thiophosphate, O,S-diphenyl thiophosphate, O,S-diphenyl dithiophosphate, S,S-diphenyl dithiophosphate, diphenyl trithiophosphate, triphenyl thiophosphate, dithiophosphate, and trithiophosphate, O,S-diphenylbutyl thiophosphate, S,S-diphenylbutyl dithiophosphate, triphenylbutyl thiophosphate, dithiophosphate, and trithiophosphate, O,O-dihexylphenyl thiophosphate, O,S-dihexylphenyl dithiophosphate, dihexylphenyl trithiophosphate, and trihexylphenyl thiophosphate, dithiophosphate, and trithiophosphate.

Specific examples of di- and triorgano thionophosphates include di- and trimethyl thionophosphate, di- and triethyl thionophosphate, di- and tributyl thionophosphate, di- and trihexyl thionophosphate, di- and tridodecyl thionophosphate, di- and triphenyl thionophosphate, ethyl phenyl thionophosphate, ethyl diphenyl thionophosphate, di- and trichlorophenyl thionophosphate, di- and triphenylbutyl thionophosphate, di- and trihexylphenyl thionophosphate, di- and triphenylethyl thionophosphate, and di- and triphenylhexyl thionophosphate.

Specific examples of di- and triorgano mono-, di-, and trithionophosphates include O,O-dimethyl thiothionophosphate, O,S-dimethyl thiothionophosphate, O,S-dimethyl dithionthionophosphate, S,S-dimethyl dithiothionophosphate, dimethyl trithiothionophosphate, trimethyl thiothionophosphate, dithiothionophosphate, and trithiothionophosphate, O,O-diethyl thiothionophosphate, O,S-diethyl dithiothionophosphate, diethyl trithiothionophosphate, triethyl thiothionophosphate, dithiothionophosphate, and trithiothionophosphate, O-ethyl S-pentyl thiothionophosphate, O-ethyl S-pentyl dithiothionophosphate, O,O-diethyl S-pentyl thiothionophosphate, O,S-diethyl O-pentyl thiothionophosphate, O,S-diethyl S-pentyl dithiothionophosphate, S,S-diethyl O-pentyl dithiothionophosphate, diethyl pentyl trithiothionophosphate, O,O-dichloroethylhexyl thiothionophosphate, S,S-dichloroethylhexyl dithiothionophosphate, dichloroethylhexyl trithionothionophosphate, trichloroethylhexyl thiothionophosphate, dithiothionophosphate, and trithiothionophosphate, O,S-didodecyl thiothionophosphate, O,S-didodecyl dithiothionophosphate, tridodecyl thiothionophosphate, dithiothionophosphate, and trithiothionophosphate, O,O-diphenyl thiothionophosphate, O,S-diphenyl thiothionophosphate, O,S-diphenyl dithiothionophosphate, S,S-diphenyl dithiothionophosphate, diphenyl trithiothionophosphate, triphenyl thiothionophosphate, dithiothionophosphate, and trithiothionophosphate, O,O-diphenylbutyl thiothionophosphate, O,S-diphenylbutyl dithiothionophosphate, triphenylbutyl thiothionophosphate, dithiothionophosphate, and trithiothionophosphate, O,S-dihexylphenyl thiothionophosphate, S,S-dihexylphenyl dithiothionophosphate, dihexylphenyl trithiothionophosphate and trihexylphenyl thiothionophosphate, dithiothionophosphate, and trithiothionophosphate.

Specific examples of diorgano organophosphonates include dimethyl methylphosphonate, dimethyl ethylphosphonate, diethyl methylphosphonate, diethyl ethylphosphonate, dichloroethyl chloroethylphosphonate, dibutyl butylphosphonate, dihexyl ethylphosphonate, dihexyl hexylphosphonate, dinonyl nonylphosphonate, didodecyl dodecylphosphonate, diethyl phenylphosphonate, ethyl hexyl phenylphosphonate, diphenyl ethylphosphonate, ethyl phenyl phenylphosphonate, diphenyl phenylphosphonate, diethylphenyl phenylphosphonate, dibutylphenyl butylphenylphosphonate, dihexylphenyl hexylphenylphosphonate, diphenylethyl phenylethylphosphonate, diphenylhexyl phenylphosphonate, and hexyl phenylhexyl phenylhexylphosphonate.

Specific examples of diorgano mono- and dithioorganophosphonates include dimethyl thiomethylphosphonate and dithiomethylphosphonate, dimethyl thioethylphosphonate and dithioethylphosphonate, diethyl thiomethylphosphonate and dithiomethylphosphonate, diethyl thioethylphosphonate and dithioethylphosphonate, dichloroethyl thiochloroethylphosphonate and dithiochloroethylphosphonate, dibutyl thiobutylphosphonate and dithiobutylphosphonate, dihexyl thiohexylphosphonate and dithiohexylphosphonate, didodecyl thiododecylphosphonate and dithiododecylphosphonate, diethyl thiophenylphosphonate and dithiophenylphosphonate, ethyl hexyl thiophenylphosphonate and dithiophenylphosphonate, diphenyl thioethylphosphonate and dithioethylphosphonate, ethyl phenyl thiophenylphosphonate and dithiophenylphosphonate, diphenyl thiophenylphosphonate and dithiophenylphosphonate, diethylphenyl thiophenylphosphonate and dithiophenylphosphonate, dihexylphenyl thiohexylphenylphosphonate and dithiohexylphenylphosphonate, diphenylethyl thiophenylethylphosphonate and dithiophenylethylphosphonate, and hexyl hexylphenyl thiophenylphosphonate and dithiophenylphosphonate.

Specific examples of diorgano organothionophosphonates include dimethyl methylthionophosphonate, dimethyl ethylthionophosphonate, diethyl methylthionophosphonate, diethyl ethylthionophosphonate, dichloroethyl chloroethylthionophosphonate, dibutyl butylthionophosphonate, dihexyl ethylthionophosphonate, dihexyl hexylthionophosphonate, dinonyl nonylthionophosphonate, didodecyl dodecylthionophosphonate, diethyl phenylthionophosphonate, ethyl hexyl phenylthionophosphonate, diphenyl ethylthionophosphonate, ethyl phenyl phenylthionophosphate, diphenyl phenylthionophosphonate, diethylphenyl phenylthionophosphonate, dibutylphenyl butylphenylthionophosphonate, dihexylphenyl hexylphenylthionophosphonate, diphenylethyl phenylethylthionophosphonate, diphenylhexyl phenylthionophosphonate, and hexyl phenylhexyl phenylhexylthionophosphonate.

Specific examples of diorgano mono- and dithioorganothionophosphonates include dimethyl thiomethylthionophosphonate, and dithiomethylthionophosphonate, dimethyl thioethylthionophosphonate and dithioethylthionophosphonate, diethyl thiomethylthionophosphonate and dithiomethylthionophosphonate, diethyl thioethylthionophosphonate and dithioethylthionophosphonate, dichloroethyl thiochloroethylthionophosphonate, and dithiochloroethylthionophosphonate, dibutyl thiobutylthionophosphonate and dithiobutylthionophosphonate, dihexyl thiohexylthionophosphonate and dithiohexylthionophosphonate, didodecyl thiododecylthionophosphonate and dithiododecylthionophosphonate, diethyl thiophenylthionophosphonate and dithiophenylthionophosphonate, ethyl hexyl thiophenylthionophosphonate and dithiophenylthionophosphonate, diphenyl thioethylthionophosphonate and dithioethylthionophosphonate, ethyl phenyl thiophenylthionophosphonate and dithiophenylthionophosphonate, diphenyl thiophenylthionophosphonate and dithiophenylthionophosphonate, diethylphenyl thiophenylthionophosphonate and dithiophenylthionophosphonate, dihexylphenyl thiohexylphenylthionophosphonate and dithiohexylphenylthionophosphonate, diphenylethyl thiophenylethylthionophosphonate and dithiophenylethylthionophosphonate, and hexyl hexylphenyl thiophenylthionophosphonate and dithiophenylthionophosphonate.

The particular phosphorus acid ester to be employed according to the method of our copending application will vary depending on the desired final product. As noted above, preferred support materials are phosphorus acid ester salts wherein the organic radicals are alkyl radicals of 1 to about 6 carbon atoms. In preparation of these salts, phosphorus acid esters employed as starting materials are those wherein each R in the formula $Y=P(YR)_2A$ is an alkyl radical of 1 to about 6 carbon atoms. Specific examples of phosphorus acid esters wherein each R in the formula $Y=P(YR)_2A$ is an alkyl radical of 1 to about 6 carbon atoms include the dimethyl, diethyl, dipropyl, dibutyl, dipentyl, and dihexyl phosphites, mono- and dithiophosphites, thionophosphites, mono- and dithiothionophosphites, orthophosphates, mono-, di-, and trithiophosphates, thionophosphates, mono-, di-, and trithiothionophosphates, the trimethyl, triethyl, tripropyl, tributyl, tripentyl, and trihexyl orthophosphates, mono-, di-, and trithiophosphates, thionophosphates, and mono-, di-, and trithiothionophosphates, and the dimethyl, diethyl, dipropyl, dibutyl, dipentyl and dihexyl alkylphosphonates, mono- and dithioalkylphosphonates, alkylthionophosphonates, and mono- and dithioalkylthionophosphonates wherein the alkyl groups are methyl, ethyl, propyl, butyl, pentyl, or hexyl. Also as described above, the phosphite, orthophosphate, and alkylphosphonate salts are preferred over the sulfur-containing phosphorus acid ester salts. Phosphorus acid esters wherein each Y in the formula $Y=P(YR)_2A$ is oxygen are employed in preparation of such materials. The support materials which are most preferred according to this invention are the dialkyl orthophosphate salts, and particularly the diethyl orthophosphate salts, and accordingly, the phosphorus acid esters used in preparation of these materials are the trialkyl orthophosphates, and particularly, triethyl orthophosphate.

The above-described starting materials are employed in amounts sufficient to give a phosphorus acid ester salt having at least one phosphorus acid ester group bonded to metal through oxygen or sulfur. Preferably, this amount is such that the equivalent ratio of phosphorus acid ester to metal-carboxylate bonds in the metal acid salt ranges from about 0.5:1 to about 10:1. At equivalent ratios below about 1:1, mixed organic acid-phosphorus acid ester salts and/or mixtures of organic acid salts and phosphorus acid ester salts are produced. While these mixed salts and mixtures of salts are useful as support materials, the preferred support materials are those wherein both groups bonded to metal are phosphorus acid ester groups bonded through oxygen or sulfur. Accordingly, equivalent ratios of phosphorus acid ester to metal-carboxylate bonds which are more preferred range from about 1:1 to about 10:1. Advantageously, an excess of the phosphorus acid ester is employed because reaction rates are thereby increased. However, the excess should not be so great as to cause difficulties in removing unreacted phosphorus acid ester because the same can adversely affect catalyst activity. Accordingly, particularly preferred equivalent ratios of phosphorus acid ester to metal-carboxylate bonds range from about 1.1:1 to about 6:1. Most preferably, this ratio ranges from about 1.1:1 to about 3:1.

The preparative reaction is carried out at any convenient temperature at which the starting materials will react but not so high as to lead to decomposition of the phosphorus acid ester employed. Preferred reaction temperatures range from about 0° to about 150° C., with temperatures in the upper portion of the range being more preferred in order to increase reaction rates. Advantageously, in the preparation of support materials wherein the organic radicals are alkyl radicals of 1 to about 6 carbon atoms from metal acetates and phosphorus acid esters wherein each R in the formula $Y=P(YR)_2A$ is an alkyl radical of 1 to about 6 carbon atoms, the organic acid esters formed as reaction by-products are materials which boil below about 150° C. Accordingly, such materials can be conveniently and substantially removed during preparation of the support material by conducting the preparation at temperatures ranging from that which is sufficient to distill the organic acid ester by-product up to about 150° C. In preparation of the diethyl orthophosphate salts from metal acetates and triethyl orthophosphate, reaction temperatures most preferably range from about 70° to about 150° C. When the starting materials are selected such that low boiling organic acid ester by-products are formed and such materials are removed during the preparation through the use of suitable temperatures, substantial completion of the preparative reaction will be indicated by the cessation of by-product evolution. In general, reaction times range from several minutes to several hours, and preferably, from about 1 to about 20 hours. More preferably, the reaction is carried out over a period of about 1 to about 10 hours.

The preparative reaction can be carried out neat or in the presence of a diluent which is liquid at reaction temperatures and substantially inert to the starting materials. Useful diluents include alkanes, such as hexane, heptane, octane, nonane, decane; cycloalkanes, such as cyclohexane; aromatics, such as benzene and ethylbenzene; and hydrogenated and halogenated aromatics such as tetrahydronaphthalene, decahydronaphthalene, and o-dichlorobenzene.

The preparative reaction according to the method of our copending application is carried out under substantially anhydrous conditions to avoid contamination of the support materials with materials capable of adversely affecting catalyst activity. Conveniently, anhydrous conditions are maintained by carrying out the preparation under an atmosphere of an inert gas such as nitrogen. Drying of the metal salts of organic acids to be employed in the preparation is desirable in this regard as is purification of any diluent to be employed, such as by percolation through molecular sieves and/or silica gel.

As a result of the above-described preparation, there are obtained divalent metal salts of phosphorus acid esters and by-product organic acid esters. As noted above, when the starting materials have been selected such that low boiling organic acid ester by-products are formed, the same are conveniently removed during the preparation through the use of suitable temperatures. By-product removal also can be achieved by decantation, filtration, and through the use of reduced pressures. After removal of reaction by-products, and prior to use as support materials according to this invention, the phosphorus acid ester salt preferably is washed with an inert hydrocarbon such as hexane or another alkane to remove incompletely reacted starting materials.

Alkylaluminum halides useful in preparation of the solid, hydrocarbon, insoluble, supported catalyst components of this invention are compounds of the empirical formula $AlR'_m X_{3-m}$ wherein $R'$ is an alkyl radical of 1 to about 20 carbon atoms, such as methyl, ethyl, butyl, hexyl, decyl, and eicosyl, X is halogen and preferably chlorine or bromine, and m is greater than 0 and less than 3, preferably from about 1 to about 2. Mixtures also can be employed. Preferred alkylaluminum halides are those wherein each alkyl radical contains 2 to about 12 carbon atoms. Such compounds include alkylaluminum dihalides such as ethylaluminum dichloride, n-hexylaluminum dichloride, and dodecylaluminum dibromide; alkylaluminum sesquihalides such as ethylaluminum sesquichloride, and isooctylaluminum sesquichloride; and dialkylaluminum halides such as diethylaluminum chloride, and di-n-hexylaluminum bromide. Alkylaluminum halides which are more preferred according to this invention are the alkylaluminum dichlorides. Most preferably, an alkylaluminum dichloride wherein the alkyl radical contains 2 to about 6 carbon atoms is employed. Ethyl aluminum dichloride is especially preferred.

The support catalysts components of this invention are prepared by reacting components comprising at least one compound of a Group IVB, VB, or VIB metal, at least one divalent metal salt of a phosphorus acid ester having at least one phosphorus acid ester group bonded to metal through oxygen or sulfur, and at least one alkylaluminum halide such that a solid, hydrocarbon insoluble catalyst component is formed.

The sequence in which the above-described components are combined is not critical except that the Group IVB, VB, or VIB metal component should not be contacted with the alkylaluminum halide prior to addition of the support material because in some cases an undesirable reduction of the Group IVB, VB, or VIB metal takes place. Usefully, the Group IVB, VB, or VIB metal component, the support material, and the alkylaluminum halide are combined concurrently or the support material and one of the other components are combined and then the remaining component is added to the result. The preferred preparative sequence according to this invention is to first combine the Group IVB, VB, or VIB metal component and the support material and then add the alkylaluminum halide component to the result.

Irrespective of the sequence in which the above-described components are combined, reaction temperatures suitably range from about $-30°$ to about $180°$ C. Preferably, temperatures range from about $15°$ to about $60°$ C. Suitable reaction times from several minutes to several hours, and preferably, from about $\frac{1}{2}$ to about 10 hours. When the Group IVB, VB, or VIB metal component and the support material are combined in a first step followed by addtion of the alkylaluminum halide to the result according to the most preferred preparative sequence, it is most preferred to carry out the first step over a period of about $\frac{1}{4}$ to about 5 hours and then combine and react the alkylaluminum halide with the resulting product over a period of about $\frac{1}{4}$ to about 5 hours.

The above-described preparation can be carried out neat or in the presence of an inert diluent. In preparative steps involving the alkylaluminum halide component, the presence of a diluent is preferred to make the component non-pyrophoric and to aid in conductance of heat evolved due to the preparative reaction away from the solid catalyst component which ultimately forms. In preparative steps not involving the alkylaluminum halide component, it often is convenient to employ a diluent to facilitate handling and mixing of the Group IVB, VB, or VIB metal component and the support material. However, when the Group IVB, VB, or VIB component comprises a liquid in which the support material is soluble, it also is convenient to combine and react such materials neat, that is, in the absence of a diluent.

Diluents suitable for use according to this invention include hydrocabons and halogenated derivatives thereof which are liquid at reaction temperatures and in which at least one of the materials employed in the preparation is soluble. Examples of useful diluents include alkanes such as hexane, heptane, octane, nonane, and so forth; cycloalkanes such as cyclohexane and ethylcyclohexane; aromatics such as ethylbenzene, and halogenated and hydrogenated aromatics such as chlorobenzene, o-dichlorobenzene, tetrahydronaphthalene, and decahydronaphthalene. Preferred diluents are the alkanes and especially hexane.

The preparation of the solid, hydrocarbon insoluble, supported catalyst components of this invention is carried out in the substantial absence of oxygen, water, carbon dioxide, and other catalyst poisons. These materials are conveniently excluded by carrying out the preparation under an atmosphere of nitrogen or other inert gas, although other suitable means also can be employed. It also is desirable to purify any diluent to be employed in the preparation, such as by percolation through molecular sieves and/or silica gel, to remove traces of oxygen, water, carbon dioxide, polar compounds, and other contaminants which may be present in the diluent.

In the preparation, the Group IVB, VB, or VIB metal component and the support material are employed in amounts such that the atomic ratio of metal contained in the Group IVB, VIB, or VIB metal component to divalent metal contaiined in the support material ranges from about 0.05:1 to about 10:1. Preferably, this ratio ranges from about 0.1:1 to about 4:1, and more preferably, from about 0.1:1 to about 1:1. Ratios ranging from about 0.1:1 to about 0.5:1 are most preferred from the standpoint of catalytic activity.

The alkylaluminum halide component is employed in at least an amount which is effective to halide the metal contained in the Group IVB, VB, or VIB component and the metal contained in the support material. This amount varies depending not only on the amount of such components employed, but also, the halogen content thereof, the valence state of the Group IVB, VB, or VIB metal, and the choice of alkylaluminum halide. Broadly, the amount of alkylaluminum halide employed is such that total moles of halogen to metal bonds in the alkylaluminum halide component, the Group IVB, VB, or VIB metal component, and support material is at least equal to (1) the product of the molar amount of Group IVB, VB, or VIB metal employed and the valence of such metal plus (2) times the molar amount of divalent metal employed. Of course, when combinations of compounds of different Group IVB, VB, and VIB metals having different valence states (e.g., a combination of a titanium(IV) compound and a vanadium(III) compound) are employed, (1) above will be the sum of the respective products of the individual molar amounts and valences. It is preferred to employ the alkylaluminum halide in an amount such that total halogen to metal bonds in the system ranges from about 1 to about 10 times the sum of (1) and (2) above. More preferably, the ratio of total halogen to the sum of (1) and (2) ranges from about 1.2:1 to about 8:1. Greater amounts of alkylaluminum halide also can be employed although gradual decreases in activity and difficulties in handling the final catalyst component due to agglomeration thereof often are observed with increasing amounts of alkylaluminum halide.

As a result of the above-described preparation there is obtained a solid, hydrocarbon insoluble, supported catalyst component which can be combined with an organometallic promoter and employed in the polymerization of alpha-olefins. Useful organometallic promoters include any of the materials commonly employed as promoters for alpha-olefin polymerization catalyst components containing compounds of the Group IVB, VB, or VIB metals. Examples of such promoters include the Group IA, IIA, IIB, IIIA and IVA metal alkyls, hydrides, alkylhydrides, and alkylhalides, such as alkyllithium compounds, dialkylzinc compounds, trialkylboron compounds, trialkylaluminum compounds, alkylaluminum halides and hydrides. Mixtures also can be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutylaluminum dichloride, dibromide, and dihydride, diethylaluminum chloride, bromide, and hydride, di-n-propylaluminum chloride, bromide, and hydride, and diisobutylaluminum chloride, bromide, and hydride. Organometallic promoters which are preferred for use according to this invention are the Group IIIA metal alkyls and dialkylhydrides having 1 to about 20 carbon atoms per alkyl radical. More preferably, the promoter is a trialkylaluminum compound having 1 to about 6 carbon atoms per alkyl radical such as trimethyl-, triethyl-, tri-n-propyl-, triisobutyl-, tri-n-pentyl-, and tri-n-hexylaluminum. Most preferably, the organometallic promoter is triethylaluminum.

The organometallic promoter is employed in at least an amount which is effective to promote the polymerization activity of the supported component. Preferably, at least about three parts, by weight, of promoter are employed per part, by weight, of solid component, although higher ratios, such as 10:1, 25:1, 100:1 or higher also are suitable and often give highly beneficial results. In solution polymerization processes, a portion of the promoter can be employed to pretreat the polymerization medium if desired.

Prior to combining the supported catalyst components of this invention with an organometallic promoter, it also is contemplated to temporarily and reversibly deactivate the components by contacting the same with a suitable deactivating agent. In this manner, the invented catalyst components, which exhibit some polymerization activity even in the absence of a promoter, can be employed, without plugging of catalyst feed lines or inlet ports, in polymerization systems wherein catalyst components are conveyed to a polymerization zone in a stream containing polymerizable alpha-olefin or wherein the component otherwise contacts polymerizable monomer prior to entry into the polymerization zone. Once inside the polymerization zone, the effects of the temporary deactivation can be undone and activity promoted by contacting the catalyst components with an organometallic promoter. Suitable deactivating agents, methods for using the same, and a method for introducing temporarily and reversibly deactivated catalyst component into a polymerization zone are disclosed in copending application Ser. No. 854,831, filed Nov. 25, 1977, now U.S. Pat. No. 4,130,699, in the name of Glen R. Hoff et al. which is incorporated herein by reference. Deactivating agents which are preferred for use with the supported catalyst components of this invention are lower aliphatic alcohols, and particularly ethanol.

According to the invention, the above-described catalysts are employed in alpha-olefin polymerization processes wherein at least one polymerizable alpha-olefin is contacted with the catalyst under polymerizing conditions. Solution, bulk, and vapor phase processes are contemplated herein.

Alpha-olefins which can be polymerized in the presence of the invented catalysts include ethylene, propylene, butene-1, pentene-1, 4-methylpentene-1, hexene-1, and mixtures thereof. Preferably, the invented catalysts are employed in the polymerization of ethylene or a mixture of ethylene with up to about 20 mole % of a higher alpha-olefin. Most preferably, the catalysts of this invention are employed in the homopolymerization of ethylene.

The conditions under which the invented catalysts are employed in the polymerization of alpha-olefins are referred to herein as "polymerizing conditions" and include catalyst concentration, polymerization temperature and time, monomer pressure, the use of diluents in solution processes, exclusion of catalyst poisons, the use of agents to regulate polymer molecular weights, and other conditions well known to persons of skill in the art. The following description of polymerizing conditions is intended to furnish guidance as to the use of the invented catalyst and is not to be construed as limiting the scope of the invention.

The amount of catalyst employed in polymerization varies depending on a number of factors, such as reactor size, and choice of monomer and can be determined by persons of skill in the art from the examples appearing hereinafter.

Polymerization temperatures will vary depending upon the type of process employed. In solution processes, wherein a solution of molten polyalpha-olefin in an inert polymerization medium is formed, the temperature should be sufficiently high to avoid solidification of the polymer but not so high as to vaporize the diluent employed. In the solution polymerization of ethylene, suitable temperatures range from about 120° to about 210° C. In particle form polymerization processes, wherein a suspension of solid, particulate polymer in an inert polymerization medium is formed, and in vapor phase processes, wherein solid, particulate polymer is formed in the absence of liquid polymerization medium, temperatures should be maintained at levels sufficiently low to avoid melting of the polymer in the polymerization zone but high enough to achieve reasonable polymerization rates. Preferred temperatures in the particle form polymerization of ethylene range from about 40° to about 110° C. In the vapor phase polymerization of ethylene, temperatures preferably range from about 40° to about 130° C., and more preferably, from about 60° to about 120° C.

In solution or particle form processes, the liquid employed as the polymerization medium can be an alkane or cycloalkane such as butane, isobutane, pentane, hexane, heptane or cyclohexane, or a hydrogenated aromatic compound such as tetrahydronaphthalene or decahydronaphthalene, or a high molecular weight liquid paraffin or mixture of paraffins which are liquid at the polymerization temperature, or an aromatic hydrocarbon such as benzene, toluene or xylene or a halogenated aromatic compound such as chlorobenzene, chloronaphthalene or ortho-dichlorobenzene. The nature of the medium is subject to considerable variation, although the medium employed should be liquid under polymerization conditions and relatively inert. Other media which can be used include ethylbenzene, isopropylbenzene, ethyltoluene, n-propylbenzene, diethylbenzenes, mono- and dialkylnaphthalenes, n-octane, isooctane and methylcyclohexane. Preferably, a butane, pentane, or hexane is employed.

Irrespective of the type of polymerization process employed, polymerization typically is carried out in the presence of agents which act as chain terminators and thereby allow for control of polyalpha-olefin molecular weights. Most commonly, hydrogen is employed for this purpose. The amount of hydrogen to be employed will vary depending upon the molecular weight desired and can be determined by those of skill in the art based upon the examples appearing hereinafter.

Also irrespective of polymerization technique, monomer pressures and total reactor pressures are maintained at levels sufficient to achieve reasonable polymerization rates and generally range from about 100 to about 1000 psig. (7 to about 70 kg/cm$^2$), and more preferably, from about 200 to about 400 psig. (14 to about 30 kg/cm$^2$).

Polymerization time generally ranges from several minutes to several hours in batch processes. Contact times ranging from about 1 to about 4 hours are common when autoclave type reactors are employed. In continuous systems, wherein polymerization medium, if any, and excess monomer are recycled to a charging zone and additional catalyst and monomer introduced, contact times in the polymerization zone can be regulated as desired, and generally range from about ½ to several hours.

Polymerization in the presence of the invented catalysts is carried out in the substantial absence of oxygen, water, carbon dioxide, and other materials capable of adversely affecting catalyst activity. Typically, special steps need not be taken to exclude such materials from the polymerization zone due to the positive pressure exerted by the alpha-olefin to be polymerized. Purification of monomer and any diluent to be employed, such as by percolation through molecular sieves and/or silica gel, or through the use of excess promoter to scavenge impurities also is helpful in excluding catalyst poisons. In polymerization processes wherein the invented supported catalyst components are contacted with a deactivating agent to facilitate addition of the component to a polymerization zone in an alpha-olefin-containing flush stream, it often is desirable to use excess promoter to scavenge the deactivator and thereby ensure the attainment of high activities.

As a result of the above-described polymerization in the presence of the invented catalysts there are obtained polyalpha-olefins, having molecular weights typically ranging from about 50,000 to about 3,000,000, in sufficiently high yields, relative to the amount of catalyst employed, that useful polymeric products are obtained without separation of catalyst residues. The polymers exhibit sufficiently broad molecular weight distributions as to be processable by a variety of techniques such as extrusion, mechanical melting, casting, and molding.

The following examples illustrate the present invention and are not to be construed as limiting the scope thereof.

EXAMPLE 1

Into a 500 ml. round bottom flask equipped with mechanical stirrer, nitrogen inlet, and condensor were added 54.5 g. anhydrous magnesium acetate, 200 ml. triethyl orthophosphate, and 100 ml. nonane. Prior to use, the magnesium acetate had been ground, dried overnight in a vacuum oven under nitrogen flow at 140° C. under vacuum of 10 inches (about 250 mm). Hg., and then reground. The magnesium acetate-triethyl orthophosphate-nonane mixture was heated to distill 75 ml. ethyl acetate. Four days later, the resulting slurry was transferred to a sinter glass funnel, the liquid was removed, and the remaining solid washed three times with about 200 ml. hexane. The washed solid then was dried overnight at 75° C. under vacuum of 25 inches (about 625 mm). Hg. There were recovered 120.5 g solid, anhydrous magnesium bis(diethyl orthophosphate).

Into a 500 ml. flask equipped with mechanical stirrer and nitrogen inlet were added 13.0 g. of the anhydrous magnesium bis(diethyl orthophosphate), 2.4 ml. titanium tetrabutoxide, and 300 ml. hexane and the mixture was stirred for 3 hours at ambient temperature. 37 ml. of 3.37 M ethylaluminum dichloride in hexane then were added slowly, with stirring, and the resulting mixture was stirred for an additional 1½ hours. A 1.1 ml. sample of the resulting suspension was removed and diluted with 50 ml. hexane. Aliquots of the result, identified as 1A, were employed according to EXAMPLE 5. The titanium to magnesium to aluminum atomic ratio was 0.18:1.0:3.2 and the ratio of halogen to metal bonds to four times titanium plus two times magnesium was 2.4:1.0.

To the suspension remaining after removal of the 1.1 ml. sample were added 23 ml. ethylaluminum dichloride solution and the resulting suspension was stirred for ½ hour. A 3.4 ml. sample was removed and diluted with additional hexane. Aliquots of the result, identified as 1B, were employed according to EXAMPLE 5. The titanium to magnesium to aluminum atomic ratio was 0.18:1.0:5.2 and the ratio of halogen to metal bonds to four times titanium plus two times magnesium was 3.8:1.0.

To the suspension remaining after removal of the 3.4 ml. sample were added an additional 20 ml. of ethylaluminum dichloride solution. Aliquots of the result, identified as 1C, were employed according to EXAMPLE 5. The titanium to magnesium to aluminum atomic ratio was 0.18:1.0:6.9 and the ratio of halogen to metal bonds to four times titanium plus two times magnesium was 5.1:1.0.

EXAMPLE 2

Into a 300 ml. flask equipped with mechanical stirrer and nitrogen inlet were added 31.2 g. anhydrous magnesium bis(diethyl orthophosphate), prepared substantially as described in EXAMPLE 1, 12.5 ml. titanium tetrabutoxide, and 100 ml. hexane. The resulting mixture was stirred for 15 minutes at ambient temperature and then 45 ml. of 3.37 M ethylaluminum dichloride in hexane were added dropwise, with stirring, over 1 hour. The contents of the flask were stirred for 2 hours following completion of the ethylaluminum dichloride addition. A 1 ml. sample of the resulting suspension was removed and diluted with 49 ml. hexane, and aliquots of the result, identified as 2A, were employed in the polymerization of ethylene according to EXAMPLE 5. The titanium to magnesium to aluminum atomic ratio in this preparation was 0.4:1.0:1.6. The ratio of halogen to metal bonds to four times titanium plus two times magnesium was 0.9:1.0.

To the suspension remaining after removal of the 1 ml. sample were added 55 ml. of the ethylaluminum dichloride solution over a period of 15 minutes and the mixture was stirred for 1 hour. A 1.4 ml. sample of the resulting suspension was diluted with 49 ml. hexane and aliquots of the result, identified as 2B, were employed according to EXAMPLE 5. The atomic ratio of titanium to magnesium to aluminum was 0.4:1.0:3.6. The ratio of halogen to metal bonds to four times titanium plus two times magnesium was 2.0:1.0.

To the suspension remaining after removal of the 1.4 ml. sample were added 35 ml. of the ethylaluminum dichloride solution and a 1.6 ml. sample of the resulting suspension was diluted with 49 ml. hexane. Aliquots of the resulting suspension, identified as 2C, were employed according to EXAMPLE 5. The atomic ratio of titanium to magnesium to aluminum was 0.4:1.0:5.0 and the ratio of halogen to metal bonds to four times titanium plus two times magnesium was 2.8:1.0.

EXAMPLE 3

Into a 300 ml. three neck, round bottom flask equipped as in EXAMPLE 2 were added 14.5 g. anhydrous magnesium bis(diethyl orthophosphate) prepared substantially as described in EXAMPLE 1, 7.0 ml. titanium tetrabutoxide, and 90 ml. hexane. The contents of the flask were stirred ten minutes at ambient temperature and then 68 ml. of a 3.37 M solution of ethylaluminum dichloride in hexane were added dropwise, with stirring, over a two hour period. These resulted a finely divided solid suspension in hexane. A 3 ml. aliquot of the suspension was removed and diluted with 47 ml. hexane. Portions of the resulting suspension were employed in the polymerization of ethylene according to EXAMPLE 5. The atomic ratio of titanium to magnesium to aluminum used in this preparation was 0.4:1.0:5.0. The molar ratio of total halogen to metal bonds to four times titanium plus two times magnesium was 2.8:1.0.

EXAMPLE 4

Into a 500 ml. flask equipped as in EXAMPLE 2 were added 16.0 g. of the anhydrous magnesium bis(-diethyl orthophosphate) prepared in EXAMPLE 1, 1.65 ml. titanium tetrabutoxide, and 300 ml. hexane. After stirring of the resulting mixture at ambient temperature for a short time, 43 ml. of a 1.12 M solution of ethylaluminum dichloride in hexane were added, with stirring, over a period of ½ hour. The resulting suspension was stirred for an additional hour after completion of the ethylaluminum dichloride addition and a 5.5 ml. sample was removed and diluted with 50 ml. hexane. Aliquots of the resulting catalyst suspension, identified as 4A, were employed according to EXAMPLE 5. The titanium to magnesium to aluminum atomic ratio was 0.1:1.0:1.0 and the ratio of halogen to metal bonds to four times titanium plus two times magnesium was 0.8:1.

To the suspension remaining after removal of the 5.5 ml. sample were added 77 ml. of the ethylaluminum dichloride solution and a 3 ml. sample of the result was removed and diluted with hexane. Aliquots of the resulting suspension, identified as 4B, were employed according to EXAMPLE 5. The titanium to magnesium to aluminum atomic ratio was 0.1:1.0:1.8 and the ratio of halogen to metal bonds to four times titanium plus two times magnesium was 1.5:1.0.

EXAMPLE 5

To a 1 liter, stirred, autoclave reactor were charged 500 ml. hexane, 40 mg. triethylaluminum, and samples of the catalyst component suspensions prepared in EXAMPLES 1-4 containing the amounts of titanium specified in TABLE 1. The catalyst component samples were combined with 20 mg. triethylaluminum and 1 ml. hexane prior to charging. Hydrogen, at pressures specified in TABLE 1, was charged to the reactor and a total pressure of 21.1 kg/cm$^2$ was maintained within the reactor by charging polymerization grade ethylene to the reactor at the start and during polymerization. Each run was carried out at 82° C. for 1 hour after which the reactor was vented, and opened to terminate the polymerization. The contents of the reactor then were discharged and the solid polyethylene separated by filtration. Results are reported in TABLE 1.

TABLE 1

| catalyst component amount[1] | H$_2$ (kg/cm$^2$) | ACT[2] | MI[3] | MWD[4] | FINES[5] (wt. %) |
|---|---|---|---|---|---|
| 1A | | | | | |
| 0.033 | 3.52 | 1670(117) | 0.6 | ND[6] | ND |
| 0.033 | 4.92 | 1440(101) | 0.5 | 38 | ND |
| 0.033 | 5.62 | 1420(100) | 1.5 | 31 | ND |
| 0.088 | 6.33 | 820(58) | 2.8 | ND | ND |
| 0.066 | 7.73 | 870(61) | 4.7 | 31 | ND |
| 1B | | | | | |
| 0.084 | 3.52 | 1120(80) | 1.0 | ND | ND |
| 0.048 | 4.92 | 1100(79) | 0.9 | 35 | ND |
| 0.060 | 6.33 | 980(70) | 3.0 | ND | ND |
| 0.060 | 7.73 | 800(57) | 6.3 | 33 | ND |
| 1C | | | | | |
| 0.033 | 3.52 | 920(64) | 0.4 | ND | ND |
| 0.066 | 4.92 | 690(49) | 1.1 | 34 | ND |
| 0.050 | 6.33 | 520(37) | 2.7 | ND | ND |
| 0.066 | 7.73 | 400(28) | 4.8 | 34 | ND |
| 2A | | | | | |
| 0.22 | 4.92 | 170 | 1.5 | 31 | 8 |
| 0.22 | 6.33 | 130 | 4.1 | ND | ND |
| 2B | | | | | |
| 0.18 | 4.92 | 300 | 1.9 | 35 | 2 |
| 0.23 | 6.33 | 200 | 5.0 | 32 | 4 |
| 2C | | | | | |
| 0.088 | 3.52 | 570 | 0.7 | 32 | 7 |
| 0.18 | 4.92 | 270 | 1.4 | 39 | 3 |
| 0.22 | 6.33 | 260 | 4.1 | 35 | 9 |
| 3 | | | | | |
| 0.14 | 4.92 | 690 | 1.6 | 33 | 13 |
| 0.18 | 6.33 | 390 | 2.1 | 34 | 7 |
| 0.26 | 7.73 | 230 | 4.1 | 34 | 12 |
| 4A | | | | | |
| 0.067 | 4.92 | 340 | 0.6 | 32 | ND |
| 0.067 | 6.33 | 410 | 2.1 | 35 | ND |
| 4B | | | | | |
| 0.035 | 6.33 | 130 | ND | ND | ND |
| 0.175 | 6.33 | 430 | 4.2 | 30 | ND |

TABLE 1-continued

| catalyst component amount[1] | H$_2$ (kg/cm$^2$) | ACT[2] | MI[3] | MWD[4] | FINES[5] (wt. %) |
|---|---|---|---|---|---|
| 0.053 | 4.92 | 690 | 1.2 | 31 | ND |

[1] Amount is expressed in mg. titanium.
[2] ACT is activity expressed in kg. polymer/g. Ti/hour. Parenthetical values represent activity in kg. polymer/g. supported catalyst component/hour.
[3] MI is Melt Index determined according to ASTM D1238-65T, Condition E, and expressed as dg/min.
[4] MWD represents the ratio (MF$_{10}$/MF$_1$) of melt index according to ASTM D1238-65T, Condition F, to MI and is an indication of molecular weight distribution.
[5] FINES represents the present, by weight, of a 10 g. sample of polymer which passed through a #70 screen in 5 minutes.
[6] ND in the table stands for not determined. EXAMPLES 1-5 and TABLE 1 illustrate preparation of magnesium bis(diethyl orthophosphate) and preparation of the invented catalyst components and the use thereof in the polymerization of ethylene. Additionally, TABLE 1 illustrates the highly desirable polymerization performance, and particularly the high activity and hydrogen sensitivity of the invented catalysts, and the low fines content of the resulting polymer.

EXAMPLE 6

Into a 300 ml. flask equipped as in EXAMPLE 2 and additionally, with a condenser, were added 15.7 g. anhydrous magnesium acetate and 50 ml. triethyl orthophosphate and the mixture was heated at the reflux temperature for about 1½ hours to distill 15 ml. ethyl acetate. The liquid remaining in the flask then was allowed to cool and 200 ml. hexane were added. The contents of the flask then were filtered and the solid magnesium bis(diethyl orthophosphate) which had formed was washed with hexane and transferred in 170 ml. hexane to a 500 ml. flask equipped as in EXAMPLE 2. To the solid in hexane were added 30 ml. titanium tetrabutoxide at ambient temperature, and after stirring for a short time 110 ml. of 3.37 M ethylaluminum dichloride in hexane were added over a period of about ½ hour. A 1.4 ml. sample of the resulting suspension was removed and diluted with 70 ml. hexane. Aliquots of the resulting suspension, identified as 6A, were employed according to EXAMPLE 8. The titanium to magnesium to aluminum atomic ratio was 0.8:1.0:3.4.

To the catalyst component suspension remaining after removal of the 1.4 ml. sample were added 60 ml. of the ethylaluminum dichloride solution at ambient temperature over a period of 15 minutes. A 1.4 ml. sample was removed, diluted with 70 ml. hexane, and aliquots of the result, identified as 6B, were employed according to EXAMPLE 8. The titanium to magnesium to aluminum atomic ratio was 0.8:1.0:5.2.

To the catalyst component suspension remaining after removal of the 1.4 ml. sample were added 100 ml. ethylaluminum dichloride solution at ambient temperature. A 1.4 ml. sample then was removed, diluted with 70 ml. hexane, and aliquots of the result, identified as 6C, were employed according to EXAMPLE 8. The titanium to magnesium to aluminum atomic ratio was 0.8:1.0:8.3.

EXAMPLE 7

Into a flask equipped as in EXAMPLE 6 were added 13.7 g. anhydrous magnesium acetate and 60 ml. diethyl phosphite and the mixture was heated at the reflux temperature for about ½ hour. 15 ml. ethyl acetate distilled during this time. The liquid remaining in the flask was cooled to about 70° C. and, on dilution with 100 ml. hexane, a solid formed. The solid was filtered, washed with hexane, and then dried in a vacuum oven. 29.5 g of solid, containing magnesium bis(ethyl phosphite) and a minor amount of diethylphosphite due to incomplete washing and drying were obtained. A 21.3 g. portion of the solid then was placed in a 300 ml. flask equipped as in EXAMPLE 2, and 100 ml. hexane and 9.7 ml. titanium tetrabutoxide added thereto. The resulting mixture was stirred for ½ hour at ambient temperature and then 33 ml. of 3.37 M ethylaluminum dichloride in hexane were added, with stirring, over 1 hour. After stirring for a short time, a 1.0 ml. sample of the resulting catalyst component suspension was removed and diluted with 49 ml. hexane. Aliquots of this suspension, identified as 7A, were employed according to EXAMPLE 8. The titanium to magnesium to aluminum atomic ratio was 0.4:1.0:1.5.

To the suspension remaining after removal of the 1.0 ml. sample were added 30 ml. ethylaluminum dichloride solution and, after stirring for a short time, a 1.2 ml. sample, identified as 7B, was removed and aliquots were employed according to EXAMPLE 8. The titanium to magnesium to aluminum atomic ratio was 0.4:1.0:3.0.

EXAMPLE 8

Ethylene was polymerized according to the procedure of EXAMPLE 5 using aliquots of the catalyst suspensions prepared in EXAMPLES 6 and 7. Results are reported in TABLE 2.

TABLE 2

| catalyst component amount | H$_2$ (kg./cm.$^2$) | ACT[2] | MI[3] | MWD[4] | FINES[5] (wt.%) |
|---|---|---|---|---|---|
| 6A | | | | | |
| 0.54 | 3.52 | 110 | 0.9 | 27 | 7 |
| 0.19 | 4.92 | 67 | 3.1 | ND[6] | ND |
| 0.81 | 6.33 | 78 | 5.0 | 30 | 12 |
| 6B | | | | | |
| 0.22 | 3.52 | 200 | 1.0 | 31 | 3 |
| 0.15 | 4.92 | 150 | 3.2 | ND | ND |
| 0.44 | 6.33 | 90 | 4.6 | 31 | 8 |
| 6C | | | | | |
| 0.54 | 3.52 | 49 | 0.6 | ND | ND |
| 0.72 | 4.92 | 60 | 1.0 | 36 | 7 |
| 0.72 | 6.33 | 84 | 4.3 | 38 | 8 |
| 7A | | | | | |
| 0.19 | 6.33 | 0 | * | * | * |
| 7B | | | | | |
| 0.38 | 3.52 | 39 | 0.13 | ND | ND |
| 0.38 | 4.92 | 82 | 1.0 | 38 | 6 |
| 0.57 | 6.33 | 66 | 2.7 | 29 | 8 |

[1]-[6] See TABLE 1.
*Polymer yield was too low to determine MI, MWD, or FINES.

EXAMPLES 6-8 and TABLE 2 further illustrate preparation of support materials employed according to this invention, the use of such support materials in preparation of catalyst components, and the polymerization performance thereof. As can be seen from the table, with the exception of component 7A, catalytic activities were good, the components showed good response to hydrogen, and fines content was low. No polymer was produced in the run using catalyst component 7A due to incomplete removal of diethyl phosphite from the support material. The additional ethylaluminum dichloride employed in preparation of catalyst 7B was sufficient to scavenge the unremoved phosphite such that the catalyst was active.

EXAMPLE 9

For comparative purposes, an inorganic phosphate salt, anhydrous magnesium phosphate (Mg$_3$(PO$_4$)$_2$), was employed as a support material in preparation of a catalyst component. The component was prepared according to the procedure of EXAMPLE 2 using 7.25 g. anhydrous magnesium phosphate, 11.2 ml. titanium tetrabutoxide, and 73 ml. 3.37 M ethylaluminum dichloride in hexane. A sample of the result was removed and diluted with hexane and aliquots of the result, identified as 9A, were employed according to EXAMPLE 12. The titanium to magnesium to aluminum ratio was 0.4:1.0:3.0.

To the remainder of the suspension were added another 50 ml. ethylaluminum dichloride solution, and a sample was removed. Aliquots of the sample, identified as 9B, were employed according to EXAMPLE 12. The titanium to magnesium to aluminum ratio was 0.4:1.0:5.0.

To the remainder of the suspension were added another 50 ml. ethylaluminum dichloride solution and aliquots, identified as 9C, were employed according to EXAMPLE 12. The titanium to magnesium to aluminum ratio was 0.4:1.0:7.0.

EXAMPLE 10

For comparative purposes, the catalyst component preparation of EXAMPLE 1 was repeated using 7.34 g. anhydrous magnesium phosphate, 5.0 ml. titanium tetrabutoxide, and 82 ml. 3.37 M ethylaluminum dichloride in hexane. Samples of the result, identified as 10A, were employed according to EXAMPLE 12. The titanium to magnesium to aluminum atomic ratio was 0.18:1.0:3.0. Additional ethylaluminum dichloride solution was added to the remaining suspension to give a titanium to magnesium to aluminum ratio of 0.18:1.0:5.0, and samples, identified as 10B, were employed according to EXAMPLE 12.

EXAMPLE 11

For comparative purposes, a catalyst component was prepared using anhydrous magnesium acetate as the support material. Into a flask equipped as in EXAMPLE 2 were added 5.4 g. anhydrous magnesium acetate, 5.2 ml. titanium tetrabutoxide, and 100 ml. hexane. This mixture was stirred for a short time and then 35 ml. 3.37 M ethylaluminum dichloride in hexane were added slowly with stirring. The result was stirred for an additional 2 hours. A sample of the resulting suspension was removed and diluted with hexane, and aliquots, identified as 11A, were employed according to EXAMPLE 12. The titanium to magnesium to aluminum atomic ratio was 0.4:1.0:3.1.

To the remaining suspension were added 20 ml. ethylaluminum dichloride solution, and a sample of the result was removed and diluted with hexane. Aliquots of the result, identified as 11B, were employed according to EXAMPLE 12. The titanium to magnesium to aluminum atomic ratio was 0.4:1.0:4.9.

EXAMPLE 12

Ethylene was polymerized as in EXAMPLE 5 using the catalyst components prepared in EXAMPLES 9–11. Results are reported in TABLE 3.

TABLE 3

| catalyst component amount[1] | $H_2$ (kg./cm.[2]) | ACT[2] | MI[3] | MWD[4] | FINES[5] (wt.%) |
|---|---|---|---|---|---|
| 9A | | | | | |
| 0.54 | 4.92 | 14 (1.7) | * | * | * |
| 1.1 | 6.33 | 4 (0.5) | * | * | * |
| 9B | | | | | |
| 0.72 | 4.92 | 11 (1.4) | * | * | * |
| 0.72 | 6.33 | 10 (1.2) | * | * | * |
| 9C | | | | | |
| 1.28 | 3.52 | 12 (1.5) | 0.13 | ND[6] | ND |
| 1.28 | 4.92 | 11 (1.3) | 0.20 | ND | ND |
| 10A | | | | | |
| 0.72 | 4.92 | 23 (1.4) | 0.4 | ND | ND |
| 0.96 | 6.33 | 8 (0.5) | * | * | * |
| 10B | | | | | |
| 10.4 | 4.92 | 28 (1.7) | 0.14 | ND | ND |
| 14 | 6.33 | 8 (0.5) | * | * | * |
| 11A | | | | | |
| 0.24 | 4.92 | 150 | 0.5 | 40 | ND |
| 0.096 | 6.33 | 110 | 1.1 | ND | ND |
| 11B | | | | | |
| 0.10 | 4.92 | 360 | 0.6 | 43 | 12 |
| 0.13 | 6.33 | 170 | 2.0 | 33 | 17 |
| 0.17 | 7.73 | 170 | 3.0 | 34 | 12 |

[1]–[6] See TABLE 1.
*Polymer yield was too low to determine MI, MWD, or FINES.

EXAMPLES 9, 10, and 12, and TABLE 3 illustrate the performance of catalyst components prepared using inorganic phosphate salts as support materials. Comparison of TABLES 1 and 2 with TABLE 3 illustrates that the use of divalent metal salts of organic esters of phosphorus acids as support materials gives catalyst components of superior performance as compared to catalyst components prepared from inorganic phosphate salts.

EXAMPLE 11 illustrates a catalyst component prepared using magnesium acetate as the support material. While catalyst performance was relatively good (see TABLE 3), comparison with TABLES 1 and 2 reveals that the invented catalysts are generally superior in terms of activity, hydrogen sensitivity, and fines content.

EXAMPLE 13

Into a 500 ml. flask equipped as in EXAMPLE 2 were added 15.9 g. of the anhydrous magnesium bis(diethyl orthophosphate) prepared in EXAMPLE 1, 2.1 ml. titanium tetrachloride, and 300 ml. hexane. This mixture was stirred for about 2 hours at ambient temperature and then divided and used as follows:

(A) Into a 500 ml. flask equipped as in EXAMPLE 2 were added 145 ml. of the above mixture and 150 ml. hexane. 35 ml. of 1.12 M ethylaluminum dichloride in hexane then were added slowly at ambient temperature and with stirring. During the addition, the mixture turned brown and the solid agglomerated. Stirring was continued for about 40 minutes following completion of the ethylaluminum dichloride addition and a 4.4 ml. sample of the result was removed. This sample was diluted with 50 ml. hexane and aliquots, identified as A(1), were employed according to EXAMPLE 15. The titanium to magnesium to aluminum ratio for this catalyst component was 0.4:1.0:1.6. To the remainder of the suspension were added 46 ml. of the ethylaluminum dichloride solution, and a 4.8 ml. sample of the result was diluted with 50 ml. hexane. Aliquots, identified as A(2) were employed according to EXAMPLE 15. The titanium to magnesium to aluminum ratio was 0.4:1.0:3.8.

(B) Into a 500 ml. flask equipped as in EXAMPLE 2 were added 151 ml. of the titanium tetrachloride-magnesium bis(diethyl orthophosphate)-hexane mixture and 150 ml. hexane. 60 ml. of a 25 wt.% solution of diethylaluminum chloride in hexane then were added slowly at ambient temperature and with stirring. After the addition was completed stirring was continued for a short time and 4.2 ml. sample of the resulting suspension was removed. This sample was diluted with 50 ml. hexane and aliquots, identified as B(1), were used according to EXAMPLE 15. The titanium to magnesium to aluminum ratio was 0.4:1.0:3.7. To the remainder of the suspension were added 35 ml. of the diethylaluminum chloride solution and a 4.4 ml. sample of the result was diluted with 50 ml. hexane. Aliquots, identified as B(2), were used according to EXAMPLE 15. The titanium to magnesium to aluminum ratio was 0.4:1.0:5.9.

EXAMPLE 14

For comparative purposes, a catalyst component was prepared, without the use of an alkylaluminum halide component, as follows: Into a 300 ml. flask equipped as in EXAMPLE 2 were added 2.6 g. anhydrous magnesium bis(diethyl orthophosphate) and 50 ml. titanium tetrachloride and the mixture was heated at about 136° C. for 3 hours. The resulting mixture then was cooled, the liquid decanted, and the solid washed with hexane several times to remove unreacted titanium tetrachloride. The washed solid then was suspended in 100 ml. hexane and a 12 ml. sample of this suspension was removed, diluted with 40 ml. hexane, and employed according to EXAMPLE 15. The atomic ratio of titanium to magnesium to aluminum employed in this preparation was 52:1.0:0, however, the final catalyst component contained a substantially lower proportion of titanium due to removal of incompletely reacted titanium compounds by washing.

EXAMPLE 15

Aliquots of the catalyst component suspensions prepared in EXAMPLES 13 and 14 were employed in the polymerization of ethylene according to the procedure of EXAMPLE 5 except that in some runs, the promoter was triisobutylaluminum (TIBA) instead of triethylaluminum (TEA). In such runs, 66 mg. TIBA were charged to the reactor and 66 mg. were combined with the catalyst samples prior to addition of the samples of the reactor. Results are reported in TABLE 4.

ble to that prepared using ethylaluminum dichloride (13A) but due to the lower halogen content of the former, a greater proportion of aluminum relative to titanium and magnesium was used to obtain such results. EXAMPLES 14 and 15 and the table illustrate the performance of a catalyst component prepared without an alkylaluminum halide component. Omission of this component led to insufficient bonding of the titanium component to the support material, and as a result, activity was poor.

EXAMPLE 16

Into a 500 ml. flask equipped as in EXAMPLE 2 were added 6.6 g. anhydrous magnesium bis(diethyl orthophosphate) and 11.3 ml. titanium tributoxychloride and the mixture was heated, with stirring, until the solid dissolved. The solution then was cooled, 270 ml. hexane were added and then 30 ml. 3.37 M ethylaluminum dichloride in hexane were added slowly with stirring. A finely divided solid began to form during the addition. Stirring was continued for a short time after completion of the ethylaluminum dichloride addition. A 2.8 ml. sample of the resulting suspension was removed and diluted with 50 ml. hexane, and aliquots, identified as A, were employed as described below. The titanium to magnesium to aluminum atomic ratio was 2.0:1.0:5. To the remainder of the suspension were added 18 ml. of the ethylaluminum dichloride solution and, after stirring for a short time, a 1.6 ml. sample was removed and diluted with 50 ml. hexane. Aliquots of the resulting suspension, identified as B, were employed as described below. The titanium to magnesium to aluminum atomic ratio was 2.0:1.0:8.0.

Ethylene was polymerized according to the procedure of EXAMPLE 15 using aliquots of suspensions A and B. Results are reported in TABLE 5.

TABLE 5

| catalyst component | PRO-MOTER | $H_2$ (kg/cm$^2$) | ACT[1] | MI[2] | MWD[3] |
|---|---|---|---|---|---|
| A | TEA | 4.92 | 92 | 0.5 | ND[4] |
|   | TEA | 4.92 | 76 | 0.7 | 27 |
|   | TEA | 6.33 | 69 | 3.0 | 33 |
|   | TIBA | 4.92 | 61 | 0.3 | 26 |
| B | TEA | 4.92 | 88 | 0.9 | 29 |
|   | TEA | 6.33 | 66 | 1.1 | 31 |
|   | TEA | 7.73 | 32 | 4.2 | ND |
|   | TIBA | 4.92 | 90 | 0.3 | 31 |

[1]ACT is activity expressed in kg. polymer/g. supported catalyst component/hour
[2]-[4] See [3], [4], [6] of TABLE 1.

TABLE 4

| CATALYST COMPONENT | PRO-MOTER | $H_2$ (kg/cm$^2$) | ACT[1] | MI[2] | MWD[3] | FINES[4] (WT.%) |
|---|---|---|---|---|---|---|
| 13A[1] | TEA | 6.33 | 35(4) | * | * | * |
| 13A[2] | TEA | 4.92 | 592(68) | 1.7 | 31 | 9 |
|  | TEA | 6.33 | 305(35) | 1.8 | 34 | 6 |
|  | TIBA | 4.92 | 766(88) | 1.8 | 34 | 6 |
|  | TIBA | 6.33 | 574(66) | 1.8 | 34 | 11 |
| 13B[1] | TEA | 6.33 | 113(13) | 2.3 | ND[5] | ND |
| 13B[2] | TEA | 4.92 | 331(38) | 2.2 | 29 | 2 |
|  | TEA** | 6.33 | 331(38) | 3.6 | 32 | 3 |
|  | TIBA | 4.92 | 461(53) | 1.3 | 27 | 1 |
|  | TIBA | 6.33 | 461(53) | 1.8 | 31 | 1 |
| 14 | TEA | 6.33 | 28(3) | 0.70 | 32 | ND |

[1]-[5] See [2]-[6], TABLE 1.
*Polymer yield was too low to determine MI, MWD, or FINES.
**In this run 60 mg. TEA were stirred with the catalyst component suspension prior to charging and 60 mg. TEA were separately charged to the reactor.

EXAMPLES 13 and 15 and TABLE 4 illustrate the preparation and polymerization performance of catalyst components prepared using titanium tetrachloride as the Group IVB, VB or VIB component and various alkylaluminum halide components. As can be observed the use of diethylaluminum chloride as the alkylaluminum halide (13B) gave a catalyst component compara- This example illustrates a preparation in which the support material and the Group IVB, VB, or VIB component were combined and reacted neat due to the solubility of the former in the latter. The neat, liquid reaction product of such components is easy to handle in subsequent preparative steps, and the use of large amounts of diluent as a suspending medium therefor is avoided. As can be seen from the table, catalyst performance was good.

EXAMPLE 17

Into a 500 ml. flask equipped as in EXAMPLE 2 were added 2.8 g. anhydrous magnesium bis(diethyl orthophosphate), 3.0 ml. zirconium tetrabutoxide ($Zr(OC_4H_9)_4 \cdot C_4H_9OH$) and 25 ml. nonane. This mixture was heated, with stirring, at about 145° C. for about 2 hours and after cooling to about 25° C., 100 ml. hexane were added. 9.0 ml. 3.37 M ethylaluminum dichloride in hexane then were added over a period of about 20 minutes during which time temperature increased from 20° to about 28° C. A 20 ml. sample of the resulting suspension was removed, diluted with 50 ml. hexane, and aliquots, identified as A, were employed as described below. The zirconium to magnesium to aluminum atomic ratio was 0.82:1.0:3.6. To the remainder of the suspension were added 11.5 ml. of the ethylaluminum dichloride solution over a 20 minute period. As a result of the addition, the suspension turned pale brown in color. After stirring of the suspension overnight, a straw brown color and some lumps were observed. A 22 ml. sample of the suspension was removed, diluted with 50 ml. hexane, and aliquots, identified as B, were employed as described below.

Ethylene was polymerized using aliquots of suspensions A and B according to the procedure of EXAMPLE 1 except that the amount of TEA charged to the reactor was 40 mg. and the amount added to the catalyst suspension was 40 mg. Results are reported in TABLE 6.

TABLE 6

| catalyst component | PRO-MOTER | $H_2$ (kg./cm.$^2$) | ACT[1] | MI[2] | MWD[3] |
|---|---|---|---|---|---|
| A | TEA | 6.33 | 3.7 | 0.8 | 32 |
|   | TEA | 7.73 | 3.4 | 1.6 | ND[4] |
| B | TEA | 6.63 | 3.0 | 0.2 | ND |
|   | TEA | 9.14 | 1.7 | 0.6 | 54 |

[1]-[4]See TABLE 5.

This example illustrates catalyst components prepared from a zirconium compound as the Group IVB, VB, or VIB metal component. From the table, it can be seen that the use of a zirconium compound can lead to a broadening of polymer molecular weight distributions as compared with catalyst components prepared using titanium compounds as the Group IVB, VB, or VIB metal component. It also can be seen that activity was substantially below that of the titanium-based catalysts of this invention (see e.g. TABLES 1 and 5). This decrease in activity was not unexpected, as it is well known that zirconium-based catalysts typically are less active than titanium-based catalysts. However, despite the general superiority of titanium-based catalysts, it can be observed that the zirconium-based catalyst component of EXAMPLE 17 exhibited better performance than the inorganic phosphate salt-supported titanium catalyst components of EXAMPLES 9 and 10.

EXAMPLE 18

Into a 500 ml. flask equipped as in EXAMPLE 2 were added 10.4 g. anhydrous magnesium bis(diethyl orthophosphate), 4.3 ml. titanium tetrabutoxide, and 11 ml. zirconium tetrabutoxide ($Zr(OC_4H_9)_4 \cdot C_4H_9OH$). This mixture was heated, with stirring, for 2 hours and then cooled to about 90° C. at which point 300 ml. hexane were added and the temperature decreased to about 50° C. To the stirred solution were added 32 ml. of 50 a wt.% ethylaluminum dichloride in hexane over about ½ hour. A sample of the resulting suspension was removed from the supension, diluted with 50 ml. hexane and aliquots of the result, identified as A, were employed as described below. The titanium to zirconium to magnesium to aluminum atomic ratio for this catalyst component was 0.4:0.8:1.0:3.4.

A series of additional catalyst components (B-D) were prepared by addition of ethylaluminum dichloride solution and removal of samples. The ethylaluminum dichloride solution was added in amounts corresponding to the following atomic ratios:

| SAMPLE | Ti:Zr:Mg:Al |
|---|---|
| B | 0.4:0.8:1.0:6.5 |
| C | 0.4:0.8:1.0:10.0 |
| D | 0.4:0.8:1.0:15.0 |

Samples of B, C, and D were each diluted with 50 ml. hexane and aliquots employed as described below.

Ethylene was polymerized using aliquots of catalyst component suspensions A-D according to the procedure of EXAMPLE 1 except that 60 mg. TEA were charged to the reactor and 40 mg. were added to the catalyst component suspension prior to charging. Results are reported in TABLE 7.

TABLE 7

| catalyst component | PRO-MOTER | $H_2$ (kg./cm.$^2$) | ACT[1] | MI[2] | MWD[3] |
|---|---|---|---|---|---|
| A | TEA | 4.92 | 17 | 0.7 | 28 |
|   | TEA | 6.33 | 10 | 1.2 | 29 |
| B | TEA | 4.92 | 25 | 0.3 | ND[4] |
|   | TEA | 6.33 | 13 | 0.6 | 33 |
|   | TEA | 7.73 | 10 | 1.2 | 37 |
| C | TEA | 4.92 | 18 | 0.4 | ND |
|   | TEA | 6.33 | 12 | 0.6 | ND |
|   | TEA | 7.73 | 12 | 0.7 | 40 |
|   | TEA | 7.73 | 9 | 0.5 | 47 |
|   | TEA | 9.14 | 11 | 7.4 | ND |
| D | TEA | 6.33 | 10 | 0.2 | ND |
|   | TEA | 7.73 | 5 | 0.2 | 62 |

[1]-[40]See TABLE 5.

This example illustrates the preparation and performance of catalyst components prepared using a mixture of titanium and zirconium compounds as the Group IVB, VB, or VIB metal component. From the table it can be seen that these catalyst components exhibited better activities than components prepared using only a zirconium compound as the Group IVB, VB, or VIB metal component, and polymer molecular weight distributions were broadened as compared with runs using catalyst components prepared using only titanium compounds as the Group IVB, VB, or VIB metal component.

EXAMPLE 19

Into a 500 ml. flask equipped as in EXAMPLE 2 were added 9.8 g. anhydrous manganous bis(diethyl orthophosphate), 300 ml. hexane, and 3.7 ml. titanium tetrabutoxide and the mixture was heated, with stirring, at 68° C. for about 6 hours. The mixture then was cooled to about 57° C. and 45 ml. 1.12 M ethylaluminum dichloride in hexane were added, with stirring, over $\frac{1}{2}$ hour. Stirring was continued overnight after which a 12 ml. sample of the resulting suspension was removed and diluted with 40 ml. hexane. Aliquots, identified as A, were employed as described below. The titanium to manganese to aluminum atomic ratio was 0.4:1.0:1.9. To the remaining suspension were added 63 ml. ethylaluminum dichloride solution over $\frac{1}{2}$ hour and a 9 ml. sample was removed and diluted with 40 ml. hexane. Aliquots, identified as B, were employed as described below. The titanium to manganese to aluminum atomic ratio was 0.4:1.0:4.5. To the remaining suspension were added 60 ml. ethylaluminum dichloride solution and a 0.8 ml. sample was removed and diluted with 50 ml. hexane. Aliquots, identified as C, were employed as described below. The titanium to manganese to aluminum atomic ratio was 0.4:1.0:7.1.

Ethylene was polymerized according to the procedure of EXAMPLE 15 using aliquots of suspensions A–C. Results are reported in TABLE 8.

TABLE 8

| catalyst component | PRO-MOTER | H$_2$ (kg./cm.$^2$) | ACT$^{(1)}$ | MI$^{(2)}$ | MWD$^{(3)}$ |
|---|---|---|---|---|---|
| A | TEA | 6.33 | 55 | 2.0 | 24 |
| B | TEA | 4.92 | 352 | 0.74 | 28 |
|   | TEA | 6.33 | 230 | 2.5 | 26 |
|   | TEA | 7.73 | 140 | 4.1 | 27 |
|   | TEA | 8.44 | 140 | 11.3 | ND$^{(4)}$ |
|   | TIBA | 4.92 | 420 | 1.0 | 30 |
| C | TEA | 4.92 | 300 | 0.93 | 33 |
|   | TEA | 6.33 | 220 | 1.9 | 27 |

$^{(1)-(4)}$ See $^{(2)-(4)}$ and $^{(6)}$ of TABLE 1.

This example illustrates the preparation and performance of catalyst component wherein a divalent manganese salt of a phosphorus acid ester was used as the support material. As can be seen from the table, the performance of catalyst components B and C compares favorably with that of components prepared using magnesium salts as the support material. The activity of component A was low due to the use of insufficient ethylaluminum dichloride.

EXAMPLE 20

The following procedure was followed in preparation of a catalyst component using an iron salt of a phosphorus acid ester as the support material:

(A) Preparation of Support Material

Into a 300 ml. flask equipped as in EXAMPLE 6 were added 5.6 g. iron filings and 100 ml. acetic acid. The contents of the flask then were heated at the reflux temperature for 3 hours and a white solid formed. Excess iron was removed with a magnet and the mixture was centrifuged. The liquid was decanted and the remaining solid washed with 400 ml. hexane to give 16.3 g. white, solid ferrous acetate. 7.0 grams of the ferrous acetate were combined with 80 ml. nonane and 40 ml. triethyl orthophosphate in a 300 ml. flask equipped as in EXAMPLE 6. The mixture was heated at the reflux temperature for 2 hours during which 8 ml. ethyl acetate distilled. The contents of the flask then were cooled and filtered, and the solid washed with 400 ml. hexane. The solid then was dried in a vacuum oven at 50° C. to give 13 g. anhydrous ferrous bis(diethyl orthophosphate).

(B) Preparation of Catalyst Component

Into a 300 ml. flask equipped as in EXAMPLE 2 were added 13 g. anhydrous ferrous bis(diethyl orthophosphate), 4.8 ml. titanium tetrabutoxide, and 100 ml. hexane. This mixture was stirred for a short time, and then 40 ml. 3.37 M ethylaluminum dichloride in hexane were added over $\frac{1}{2}$ hour with continued stirring. A 2 ml. sample of the resulting suspension was removed and diluted with 48 ml. hexane. Aliquots of the result, identified as B(1), were employed as described below. The atomic ratio of titanium to iron to aluminum was 0.4:1.0:3.8. To the remaining suspension were added 25 ml. of the ethylaluminum dichloride solution, and a 2 ml. sample was removed and diluted with 48 ml. hexane. Aliquots of the result were employed as described below. The titanium to iron to aluminum atomic ratio was 0.4:1.0:6.1.

(C) Polymerization

Ethylene was polymerized according to the procedure of EXAMPLE 15 using aliquots of catalyst component suspensions B(1) and B(2). Results are reported in TABLE 9.

TABLE 9

| catalyst component | PRO-MOTER | H$_2$ (kg./cm.$^2$) | ACT$^{(1)}$ | MI$^{(2)}$ | MWD$^{(3)}$ |
|---|---|---|---|---|---|
| B$^{(1)}$ | TEA | 6.33 | 23 | 0.24 | 32 |
|   | TEA | 8.44 | 6 | 0.11 | ND$^{(4)}$ |
|   | TEA | 10.55 | 7 | 0 | ND |
| B$^{(2)}$ | TEA | 6.33 | 16 | 0.15 | ND |

$^{(1)-(4)}$ See TABLE 5.

This example illustrates the use of an iron salt of a phosphorus acid ester as a support material and the performance of the resulting catalyst component. From the table it can be seen that the catalyst components, while less active than those prepared using divalent magnesium or manganese salts of phosphorus acid esters as support materials, gave good results.

EXAMPLE 21

This example illustrates the preparation and performance of a temporarily and reversibly deactivated catalyst component.

Into a 500 ml. round bottom flask equipped with mechanical stirrer and nitrogen purge were added 12.7 g. anhydrous magnesium bis(diethyl orthophosphate), 5.2 ml. titanium tetrabutoxide, and 300 ml. hexane. This mixture was stirred one hour at room temperature and then allowed to stand overnight. Fifty-four ml. of a 3.37 M ethylaluminum dichloride solution in hexane then were added over about $\frac{1}{2}$ hour. 43.4 ml. of the resulting catalyst component suspension were removed and aliquots of the result, identified as A, were employed as described below. The solid in the remainder of the suspension was allowed to settle and then 160 ml. of the clear supernatant were decanted and 200 ml. hexane were added. The catalyst component was stirred several minutes and again allowed to settle, after which 170 ml. clear supernatant was removed and 100 ml. hexane added. A mixture of 2.4 ml. anhydrous ethanol and 16 ml. hexane then were added slowly to the stirred suspension. A 42 ml. sample of the stirred suspension was removed and 2 ml. thereof were diluted with 50 ml.

hexane. Aliquots of the result, identified as B, were employed as described below. To the remaining suspension were added 1 ml. ethanol and 6 ml. hexane. A sample of the result was removed, diluted with hexane, and aliquots thereof, identified as C, were employed as described below. Assuming uniform distribution of aluminum compounds throughout the supernatant removed from the original suspension, the molar ratios of ethanol to metal alkyl bonds contained in catalyst components B and C were 1:1 and 1:1.5 respectively.

A series of ethylene polymerizations were conducted using samples of catalyst components A-C. The polymerizations were carried out as in EXAMPLE 1 except that no promoter or hydrogen was used and the temperature was 27° C. Results are reported in TABLE 10.

TABLE 10

| CATALYST COMPONENT | YIELD (g) | ACTIVITY (kg.polymer/g.catalyst component/hr.) |
|---|---|---|
| A | 19.6 | 0.34 |
| A | 87.6 | 1.54 |
| B | 8.6 | 0.14 |
| B | 14.7 | 0.25 |
| C | 5.3 | 0.09 |

Another series of polymerizations was conducted according to the procedure of EXAMPLE 1 using samples of catalyst components A-C and the amounts of TEA specified in TABLE 11. In the runs using 60 mg. TEA, 20 mg. were stirred with the catalyst component suspension prior to charging and 40 mg. were separately charged to the reactor. In runs using 100 mg. TEA, 40 mg. were stirred with the catalyst component suspension and 60 mg. were separately charged. Results are reported in TABLE 11.

TABLE 11

| CATALYST COMPONENT | TEA (mg.) | H$_2$ (kg./cm.$^2$) | ACT$^{(1)}$ | MI$^{(2)}$ | MWD$^{(3)}$ |
|---|---|---|---|---|---|
| A | 60 | 4.92 | 101 | 0.50 | 34 |
|   | 100 | 4.92 | 103 | 0.8 | ND$^{(4)}$ |
|   | 100 | 6.33 | 70 | 0.8 | ND |
| B | 100 | 4.92 | 141 | 0.5 | ND |
|   | 60 | 6.33 | 108 | 2.2 | ND |
| C | 60 | 4.92 | 88 | 0.8 | 27 |
|   | 60 | 6.33 | 63 | 1.0 | 32 |

$^{(1)-(4)}$See TABLE 5.

From TABLE 10 it can be seen that the undeactivated catalyst component (A) exhibited some polymerization activity even in the absence of a promoter, while the deactivated components (B and C) were essentially inactive in the absence of a promoter. From TABLE 11 it can be seen that when combined with a promoter and employed in the polymerization of ethylene, the performance of the deactivated components (B and C) was comparable to that of the undeactivated component (A).

We claim:

1. An alpha-olefin polymerization catalyst comprising (A) an organometallic promoter selected from the group consisting of Group IA, IIA, IIB, IIIA, and IVA metal alkyls, hydrides, alkylhydrides, and alkylhalides; and (B) a solid, hydrocarbon insoluble component which is the reaction product of components comprising (1) at least one compound of a Group IVB, VB or VIB metal, (2) at least one divalent metal salt of a phosphorus acid ester, said salt containing the structure

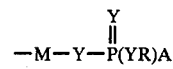

wherein M is a divalent Group IIA, IIB, IVA, VIIB, or VIII metal, each Y is independently oxygen or sulfur, A is hydrogen, —YH, R, or —YR, and each R is independently an organic radical or a halo- or amino-substituted organic radical, said organic radical being an alkyl radical of 1 to about 12 carbon atoms, an aryl radical of 6 to about 10 carbon atoms, or an alkaryl or aralkyl radical of 7 to about 12 carbon atoms, and (3) at least one alkylaluminum halide, wherein the atomic ratio of metal contained in (1) to metal contained in (2) ranges from about 0.05:1 to about 10:1 and the amount of (3) employed is at least effective to halide the metal contained in (1) and (2); said reaction being carried out under substantially anhydrous conditions.

2. The catalyst of claim 1 wherein the at least one compound of a Group IVB, VB, or VIB metal comprises a halide, oxohalide, alkoxide, oxoalkoxide, alkoxyhalide or oxoalkoxyhalide of titanium(IV), zirconium-(IV), or vanadium(III), (IV), or (V).

3. The catalyst of claim 2 wherein the organometallic promoter is a Group IIIA metal alkyl or dialkylhydride having 1 to about 20 carbon atoms per alkyl radical.

4. The catalyst of claim 3 wherein (2) comprises a compound of the formula

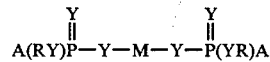

wherein M is magnesium, manganese(II) or iron(II).

5. The catalyst of claim 4 wherein the at least one compound of a Group IVB, VB, or VIB metal comprises a titanium(IV) chloride, bromide, alkoxide, alkoxychloride, or alkoxybromide having 1 to about 10 carbon atoms per alkoxy radical; a zirconium(IV) chloride, bromide, alkoxide, alkoxychloride or alkoxybromide having 1 to about 10 carbon atoms per alkoxy radical; a vanadium(III) or (IV) chloride, bromide, alkoxide, alkoxychloride or alkoxybromide having 1 to about 10 carbon atoms per alkoxy radical; a vanadium(IV) or (V) oxochloride, oxobromide, oxoalkoxide, oxoalkoxychloride, or oxoalkoxybromide having 1 to about 10 carbon atoms per alkoxy radical; or a mixture thereof.

6. The catalyst of claim 5 wherein each organic radical in the formula

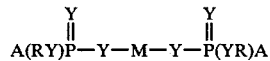

is independently an alkyl radical of 1 to about 6 carbon atoms.

7. The catalyst of claim 6 wherein the phosphorus acid ester salt is the reaction product of an anhydrous, divalent metal salt of an alkanoic acid of 2 to about 6 carbon atoms with a phosphorus acid ester of the formula Y=P(YR)$_2$A wherein each Y is independently oxygen or sulfur, A is hydrogen, —YH, R, or —YR, and each R is an alkyl group of 1 to about 6 carbon atoms; the anhydrous, divalent metal salt and phosphorus acid ester being employed in amounts such that the equivalent ratio of phosphorus acid ester to metal-carboxylate bonds in the anhydrous divalent metal salt ranges from about 1:1 to about 10:1, said reaction being carried out at a temperature ranging from about 0° to about 150° C.

8. The catalyst of claim 6 wherein the alkylaluminum halide is an alkylaluminum dichloride wherein the alkyl radical contains 1 to about 6 carbon atoms.

9. The catalyst of claim 8 wherein the phosphorus acid ester salt is an alkyl phosphite, mono- or dialkyl orthophosphate, or alkyl alkylphosphonate salt containing 1 to about 6 carbon atoms per alkyl radical.

10. The catalyst of claim 9 wherein the phosphorus acid ester salt is the reaction product of an anhydrous, divalent metal acetate with a dialkyl phosphite, di- or trialkyl orthophosphate, or dialkyl alkylphosphonate having 1 to about 5 carbon atoms per alkyl radical in amounts such that the equivalent ratio of phosphorus acid ester to metal-acetate bonds in the metal acetate ranges from about 1.1:1 to about 6:1, said reaction being carried out at a temperature ranging from that which is effective to distill organic acid ester by-products to about 150° C.

11. The catalyst of claim 9 wherein the at least one compound of a Group IVB, VB, or VIB metal comprises a titanium(IV) compound selected from the group consisting of titanium tetrachloride, tetraalkoxides, and alkoxychlorides having 1 to about 6 carbon atoms per alkoxy radical, or a mixture of said titanium(IV) compound with a zirconium(IV) compound selected from the group consisting of zirconium tetrachloride, tetraalkoxides, or alkoxychlorides having 1 to about 6 carbon atoms per alkoxy radical.

12. The catalyst of claim 11 wherein the phosphorus acid ester salt is a bis(dialkyl orthophosphate) salt wherein each alkyl radical contains 1 to about 6 carbon atoms.

13. The catalyst of claim 12 wherein the at least one compound of a Group IVB, VB, or VIB metal is a titanium tetraalkoxide.

14. The catalyst of claim 13 wherein the alkylaluminum dichloride is ethylaluminum dichloride.

15. The catalyst of claim 14 wherein the divalent metal salt of a phosphorus acid ester is magnesium bis(diethyl orthophosphate).

16. The catalyst of claim 15 wherein the magnesium bis(diethyl orthophosphate) is prepared by reacting anhydrous magnesium acetate with triethyl orthophosphate at about 70° to about 150° C. in amounts such that the equivalent ratio of triethyl orthophosphate to metal-acetate bonds ranges from about 1.1:1 to about 3:1.

17. The catalyst of claim 15 wherein the organometallic promoter is a trialkylaluminum having 1 to about 6 carbon atoms per alkyl radical.

18. The catalyst of claim 15 wherein the titanium tetraalkoxide is titanium tetrabutoxide.

19. The catalyst of claim 18 wherein the trialkylaluminum is triethylaluminum.

20. The catalyst of claim 12 wherein the at least one compound of a Group IVB, VB, or VIB metal is a mixture of a titanium tetraalkoxide having 1 to about 6 carbon atoms per alkoxy radical and a zirconium tetraalkoxide having 1 to about 6 carbon atoms per alkoxy radical.

21. The catalyst of claim 20 wherein the alkylaluminum dichloride is ethylaluminum dichloride.

22. The catalyst of claim 21 wherein the divalent metal salt of a phosphorus acid ester is magnesium bis(diethyl orthophosphate).

23. The catalyst of claim 22 wherein the magnesium bis(diethyl orthophosphate) is prepared by reacting anhydrous magnesium acetate with triethyl orthophosphate at about 70° to about 150° C. in amounts such that the equivalent ratio of triethyl orthophosphate to metal-acetate bonds ranges from about 1.1:1 to about 3:1.

24. The catalyst of claim 22 wherein the organometallic promoter is a trialkylaluminum having 1 to about 6 carbon atoms per alkyl radical.

25. The catalyst of claim 24 wherein the titanium tetraalkoxide is titanium tetrabutoxide, the zirconium tetraalkoxide is zirconium tetrabutoxide, and the atomic ratio of zirconium to titanium ranges from about 0.1:1 to about 10:1.

26. The catalyst of claim 25 wherein the trialkylaluminum is triethylaluminum.

27. The catalyst of claim 1 wherein the solid, hydrocarbon insoluble component, (B), is contacted with an agent capable of temporarily and reversibly deactivating said component.

28. The catalyst of claim 27 wherein the agent is ethanol.

29. An alpha-olefin polymerization catalyst comprising (A) an organometallic promoter selected from the group consisting of Group IA, IIA, IIB, IIIA, and IVA metal alkyls, hydrides, alkylhydrides, and alkylhalides; and (B) and solid, hydrocarbon insoluble component which is the reaction product of components comprising (1) at least one compound of a Group IVB, VB, or VIB metal, (2) at least one divalent metal salt of a phosphorus acid ester prepared by reacting (a) at least one divalent Group IIA, IIB, IVA, VIIB, or VIII metal salt of an organic acid with (b) at least one phosphorus acid ester of the formula

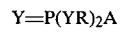

$$Y=P(YR)_2A$$

wherein each Y is independently oxygen or sulfur, A is hydrogen, —YH, —YR, or R, and each is R is independently an organic radical or an amino- or halo-substituted organic radical, said organic radical being an alkyl radical of 1 to about 12 carbon atoms, an aryl radical of 6 to about 10 carbon atoms or an alkaryl or aralkyl radical of 7 to about 12 carbon atoms, wherein said components (a) and (b) are reacted in amounts such that a phosphorus acid ester salt having at least one phosphorus acid ester group bonded to metal through oxygen or sulfur is produced and the reaction temperature is such that said components (a) and (b) will react without substantial decomposition of (b); and (3) at least one alkylaluminum halide; wherein the atomic ratio of metal contained in (1) to metal contained in (2) ranges from about 0.05:1 to about 10:1 and the amount of (3) employed is at least effective to halide the metal contained in (1) and (2); said reaction being carried out under substantially anhydrous conditions.

30. The catalyst of claim 29 wherein (1) comprises a halide, oxohalide, alkoxide, oxoalkoxide, alkoxyhalide, or oxoalkoxyhalide of titanium(IV), zirconium(IV), or vanadium(III), (IV) or (V).

31. The catalyst of claim 30 wherein the organometallic promoter is a Group IIIA metal alkyl or dialkylhydride having 1 to about 20 carbon atoms per alkyl radical.

32. The catalyst of claim 31 wherein (2) (a) comprises a divalent metal salt of an organic acid selected from the group consisting of aliphatic acids of 2 to about 20 carbon atoms, aromatic acids of 7 to about 12 carbon atoms, and aliphatically-substituted aromatic acids and aromatically-substituted aliphatic acids of 8 to about 20 carbon atoms.

33. The catalyst of claim 31 wherein (2) (a) comprises a salt of divalent magnesium, manganese, or iron and each R in the formula Y=P(YR)$_2$A is independently an alkyl radical of 1 to about 6 carbon atoms.

34. The catalyst of claim 33 wherein (2) (a) comprises a salt of an alkanoic acid of 2 to about 6 carbon atoms.

35. The catalyst of claim 34 wherein the equivalent ratio of (2) (b) to (2) (a) ranges from about 1:1 to about 10:1 and the reaction temperature ranges from about 0° to about 150° C.

36. The catalyst of claim 35 wherein (3) comprises an alkylaluminum dichloride wherein the alkyl radical contains 1 to about 6 carbon atoms.

37. The catalyst of claim 36 wherein each Y in the formula Y=P(YR)$_2$A is oxygen.

38. The catalyst of claim 37 wherein (2) (a) is a metal acetate and (2) (b) comprises a trialklyl orthophosphate having 1 to about 6 carbon atoms per alkyl radical.

39. The catalyst of claim 38 wherein (1) is a titanium-(IV) compound selected from the group consisting of titanium tetrachloride, tetraalkoxides, and alkoxychlorides having 1 to about 6 carbon atoms per alkoxy radical, or a mixture of said titanium(VI) compound with a zirconium(IV) compound selected from the group consisting of zirconium tetrachloride, tetraalkoxides, and alkoxychlorides having 1 to about 6 carbon atoms per alkoxy radical.

40. The catalyst of claim 39 wherein (3) is ethylaluminum dichloride.

41. The catalyst of claim 40 wherein (2) (a) is magnesium acetate and (2) (b) is triethyl orthophosphate.

42. The catalyst of claim 41 wherein (1) is titanium tetrabutoxide.

43. The catalyst of claim 41 wherein (1) is a mixture of titanium tetrabutoxide and zirconium tetrabutoxide.

44. The catalyst of claim 41 wherein the organometallic promoter is triethylaluminum or triisobutylaluminum.

45. The catalyst of claim 29 wherein the solid, hydrocarbon soluble component, (B), is contacted with an agent capable of temporarily and reversibly deactivating said component.

* * * * *

UNITED STATES PATENT OFFICE
CERTIFICATE OF CORRECTION

Patent No. 4,233,182  Dated November 11, 1980

Inventor(s) GLEN R. HOFF and PETER FOTIS

It is certified that error appears in the above-identified patent and that said Letters Patent are hereby corrected as shown below:

| Patent Col. | Line | |
|---|---|---|
| 4 | 28 | "or the Period Table," should be --of the Periodic Table,-- |
| 6 | 6 | "IVa," should be --IVA-- |
| 7 | 25 | "of thioesters" should be --or thioesters-- |
| 11 | 26 | "trithionophosphates" should be --trithiothionophosphates-- |
| 15 | 2 | "hydrocarbon, insoluble," should be --hydrocarbon insoluble,-- |
| 15 | 24 | "support" should be --supported-- |
| 15 | 52 | "times from" should be --times range from-- |
| 15 | 56 | "addtion" should be --addition-- |
| 16 | 11 | "hydrocabons" should be --hydrocarbons-- |
| 16 | 39 | "contaiined" should be --contained-- |
| 21 | 37 | "These resulted" should be --There resulted-- |
| 21 | 38 | "suspension" should be --suspended-- |
| 23 | 12 | In Footnote (5), "the present" should be --the percent-- |

UNITED STATES PATENT OFFICE
CERTIFICATE OF CORRECTION

Patent No. 4,233,182   Dated November 11, 1980

Inventor(s)  GLEN R. HOFF and PETER FOTIS

Page 2

It is certified that error appears in the above-identified patent and that said Letters Patent are hereby corrected as shown below:

Patent

| Col. | Line | |
|---|---|---|
| 23 | 13-18 | "EXAMPLES 1-5" should start a new paragraph of text rather than being included in footnote (6) |
| 27 | 46 | "of" (second occurrence) should be --to-- |
| 27 | | In TABLE 4, "CATALYST COMPONENT" Column: <br> "$13A^{(1)}$" should be --13A(1)-- <br> "$13A^{(2)}$" should be --13A(2)-- <br> "$13B^{(1)}$" should be --13B(1)-- <br> "$13B^{(2)}$" should be --13B(2)-- |
| 30 | 11 | "50 a wt.%" should be --50 wt.%-- |
| 30 | 14-15 | "hex- and" should be --hexane,and-- |
| 30 | 54 | "$(1)-(40)$" should be --$(1)-(4)$-- |
| 32 | 31 | "$B^{(1)}$" in catalyst component column should be --B(1)-- |
| 32 | 34 | "$B^{(2)}$" in catalyst component column should be --B(2)-- |
| 35 | 14 | "5" should be --6-- |

UNITED STATES PATENT OFFICE
CERTIFICATE OF CORRECTION

Patent No. 4,233,182             Dated November 11, 1980

Inventor(s) GLEN R. HOFF and PETER FOTIS

It is certified that error appears in the above-identified patent and that said Letters Patent are hereby corrected as shown below:

Patent
Col.   Line 36     25     "and (B) and solid" should be --and (B) a solid--

36     38     "each is R is" should be --each R is--

Signed and Sealed this

Twenty-seventh Day of October 1981

[SEAL]

Attest:

Attesting Officer

GERALD J. MOSSINGHOFF

Commissioner of Patents and Trademarks